(12) United States Patent
Printezis et al.

(10) Patent No.: US 7,293,051 B1
(45) Date of Patent: Nov. 6, 2007

(54) COLLECTION-SET SELECTION USING A SMALL PRIORITY QUEUE

(75) Inventors: Antonios Printezis, Burlington, MA (US); David L. Detlefs, Westford, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 515 days.

(21) Appl. No.: 10/884,526

(22) Filed: Jul. 1, 2004

(51) Int. Cl.
*G06F 17/30* (2006.01)
*G06F 9/46* (2006.01)

(52) U.S. Cl. .................................... 707/206; 718/104
(58) Field of Classification Search ................ 707/206; 718/104
See application file for complete search history.

(56) References Cited

U.S. PATENT DOCUMENTS

| | | | | |
|---|---|---|---|---|
| 4,989,134 A | * | 1/1991 | Shaw | 707/206 |
| 5,088,036 A | * | 2/1992 | Ellis et al. | 707/206 |
| 6,098,089 A | * | 8/2000 | O'Connor et al. | 718/104 |
| 6,185,581 B1 | * | 2/2001 | Garthwaite | 707/206 |
| 6,892,212 B2 | * | 5/2005 | Shuf et al. | 707/206 |

* cited by examiner

*Primary Examiner*—Don Wong
*Assistant Examiner*—Hung Tran Vy
(74) *Attorney, Agent, or Firm*—Osha Liang LLP

(57) ABSTRACT

A space-incremental garbage collector performs marking operations that are usually separated by several collection increments. It uses the marking results to compute collection-efficiency metrics for regions into which it treats the heap as divided. It bases its selection of regions for successive increments' collection sets on the metrics' values, whose computations also depend on the sizes of the regions' "remembered sets," i.e., on the lists of locations where references to objects in those regions have been observed. Although the remembered-set sizes therefore potentially change between collection increments, the collector re-computes metrics in most collection increments for only a subset of the regions. It selects the subset in accordance with a sorting of all regions that it performed at the end of the most recent completed marking operation.

43 Claims, 15 Drawing Sheets

COLLECTION-SET SELECTION USING A SMALL PRIORITY QUEUE

BACKGROUND OF THE INVENTION

1. Field of the Invention

The present invention concerns computer-program compiling and in particular to what has in that discipline come to be referred to as "garbage collection."

2. Background Information

Garbage collection is the term that has come to be used for the operations by which data objects that a program will no longer use are recognized so that the computer memory occupied by those objects can be reclaimed for reuse. For the purposes of this discussion, the term object refers to a data structure represented in a computer system's memory. Other terms sometimes used for the same concept are record and structure. An object may be identified by a reference, a relatively small amount of information that can be used to access the object. A reference can be represented as a "pointer" or a "machine address," which may require, for instance, only sixteen, thirty-two, or sixty-four bits of information, although there are other ways to represent a reference.

In some systems, which are usually known as "object oriented," objects may have associated methods, which are routines that can be invoked by reference to the object. An object also may belong to a class, which is an organizational entity that may contain method code or other information shared by all objects belonging to that class. In the discussion that follows, though, the term object will not be limited to such structures; it will additionally include structures with which methods and classes are not associated.

Garbage collection is used almost exclusively in environments in which memory can be allocated to some objects dynamically. Not all systems employ dynamic allocation. In some computer languages, source programs must be so written that all objects to which the program's variables refer are bound to storage locations at compile time. This storage-allocation approach, sometimes referred to as "static allocation," is the policy traditionally used by the Fortran programming language, for example.

Even for compilers that are thought of as allocating objects only statically, of course, there is often a certain level of abstraction to this binding of objects to storage locations. Consider the typical computer system 10 depicted in FIG. 1, for example. Data that a microprocessor 11 uses and instructions for operating on them may reside in onboard cache memory or be received from further cache memory 12, possibly through the mediation of a cache controller 13. That controller 13 can in turn receive such data from system read/write memory ("RAM") 14 through a RAM controller 15 or from various peripheral devices through a system bus 16. The memory space made available to an application program may be "virtual" in the sense that it may actually be considerably larger than RAM 14 provides. So the RAM contents will be swapped to and from a system disk 17.

Additionally, the actual physical operations performed to access some of the most-recently visited parts of the process's address space often will actually be performed in the cache 12 or in a cache on board microprocessor 11 rather than on the RAM 14. Those caches would swap data and instructions with the RAM 14 just as RAM 14 and system disk 17 do with each other.

A further level of abstraction results from the fact that an application will often be run as one of many processes operating concurrently with the support of an underlying operating system. As part of that system's memory management, the application's memory space may be moved among different actual physical locations many times in order to allow different processes to employ shared physical memory devices. That is, the location specified in the application's machine code may actually result in different physical locations at different times because the operating system adds different offsets to the machine-language-specified location.

Some computer systems may employ a plurality of processors so that different processes' executions actually do occur simultaneously. Such systems come in a wide variety of configurations. Some may be largely the same as that of FIG. 1 with the exception that they include more than one microprocessor such as processor 11, possibly together with respective cache memories, sharing common read/write memory by communication over the common bus 16.

In other configurations, parts of the shared memory may be more local to one or more processors than to others. In FIG. 2, for instance, one or more microprocessors 20 at a location 22 may have access both to a local memory module 24 and to a further, remote memory module 26, which is provided at a remote location 28. Because of the greater distance, though, port circuitry 29 and 30 may be necessary to communicate at the lower speed to which an intervening channel 32 is limited. A processor 34 at the remote location may similarly have different-speed access to both memory modules 24 and 26. In such a situation, one or the other or both of the processors may need to fetch code or data or both from a remote location, but it will often be true that parts of the code will be replicated in both places.

Despite these expedients, the use of static memory allocation in writing certain long-lived applications makes it difficult to restrict storage requirements to the available memory space. Abiding by space limitations is easier when the platform provides for dynamic memory allocation, i.e., when the platform enables allocation of memory space to be delayed until after the program has been loaded and is already running.

Dynamic allocation has a number of advantages, among which is that the run-time system is able to adapt allocation to run-time conditions; for given objects the programmer can specify respective conditions on which space should be allocated to them. The C-language library function malloc( ) is often used for this purpose. Conversely, the programmer can specify conditions under which memory previously allocated to a given object can be reclaimed for reuse. The C-language library function free( ) results in such memory reclamation.

Because dynamic allocation provides for memory reuse, it facilitates generation of large or long-lived applications, which over the course of their lifetimes may employ objects whose total memory requirements would greatly exceed the available memory resources if they were bound to memory locations statically.

Particularly for long-lived applications, though, allocation and reclamation of dynamic memory must be performed carefully. If the application fails to reclaim unused memory—or, worse, loses track of the address of a dynamically allocated segment of memory—its memory requirements will grow over time to exceed the system's available memory. This kind of error is known as a "memory leak." Another kind of error occurs when an application reclaims memory for reuse even though it still maintains a reference to that memory. If the reclaimed memory is reallocated for a different purpose, the application may inadvertently manipulate the same memory in multiple inconsistent ways.

This kind of error is known as a "dangling reference," because an application should not retain a reference to a memory location once that location is reclaimed. Explicitly managing dynamic memory by using interfaces like malloc( )/free( ) often leads to these problems.

Such leaks and related errors can be made less likely by reclaiming memory space more automatically. As was mentioned above, the software and/or hardware used for this purpose is typically referred to as a garbage collector. Garbage collectors operate by inspecting the running program's current state, determining from that state whether it can decide that there are some objects that the program can no longer reach, and reclaiming objects thus found not to be reachable. The criteria that garbage collectors use for this purpose vary, but, for example, a program's global variables are normally considered reachable throughout a program's life. Although they are not ordinarily stored in the memory space that the garbage collector manages, they may contain references to dynamically allocated objects that are, and the garbage collector will consider such objects reachable. It will typically also consider an object reachable if it is referred to by a reference in a register or a thread's call stack. And reachability is contagious: if a reachable object refers to another object, that other object is reachable, too.

It is advantageous to use garbage collectors because, whereas a programmer working on a particular sequence of code can perform his task creditably in most respects with only local knowledge of the application, memory allocation and reclamation tend to require more-global knowledge. A programmer dealing with a small subroutine, for example, may well be able to identify the point in the subroutine beyond which the routine has finished with a given memory portion, but knowing whether the application as a whole will be finished with it at that point is often much more difficult. In contrast, garbage collectors typically work by tracing references from some conservative notion of a "root set," e.g., global variables, registers, and the call stack: they thereby obtain reachability information methodically. By using a garbage collector, the programmer is relieved of the need to worry about the application's global state and can concentrate on (more-manageable) local-state issues. The result is applications that are more robust, having no dangling references and fewer memory leaks.

Garbage-collection mechanisms can be implemented by various parts and levels of a computing system. One approach is simply to provide them as part of a batch compiler's output. Consider FIG. 3's simple batch-compiler operation, for example. A computer system executes in accordance with compiler object code and therefore acts as a compiler 36. The compiler object code is typically stored on a medium such as FIG. 1's system disk 17 or some other machine-readable medium, and it is loaded into RAM 14 to configure the computer system to act as a compiler. In some cases, though, the compiler object code's persistent storage may instead be provided in a server system remote from the machine that performs the compiling. The electrical signals that typically carry the digital data by which the computer systems exchange that code are examples of the kinds of electromagnetic signals by which the computer instructions can be communicated. Others are radio waves, microwaves, and both visible and invisible light.

The input to the compiler is the application source code, and the end product of the compiler process is application object code. This object code defines an application 38, which typically operates on input such as mouse clicks, etc., to generate a display or some other type of output. This object code implements the relationship that the programmer intends to specify by his application source code. In one approach to garbage collection, the compiler 36, without the programmer's explicit direction, additionally generates code that automatically reclaims unreachable memory space.

Even in this simple case, though, there is a sense in which the application does not itself provide the entire garbage collector. Specifically, the application will typically call upon the underlying operating system's memory-allocation functions. And the operating system may in turn take advantage of hardware that lends itself particularly to use in garbage collection. So even a very simple system may disperse the garbage-collection mechanism over a number of computer-system layers.

To get some sense of the variety of system components that can be used to implement garbage collection, consider FIG. 4's example of a more complex way in which various levels of source code can result in the machine instructions that a processor executes. In the FIG. 4 arrangement, the human applications programmer produces source code 40 written in a high-level language. A compiler 42 typically converts that code into "class files." These files include routines written in instructions, called "byte code" 44, for a "virtual machine" that various processors can be software-configured to emulate. This conversion into byte code is almost always separated in time from that code's execution, so FIG. 4 divides the sequence into a "compile-time environment" 46 separate from a "run-time environment" 48, in which execution occurs. One example of a high-level language for which compilers are available to produce such virtual-machine instructions is the Java™ programming language. (Java is a trademark or registered trademark of Sun Microsystems, Inc., in the United States and other countries.)

Most typically, the class files' byte-code routines are executed by a processor under control of a virtual-machine process 50. That process emulates a virtual machine from whose instruction set the byte code is drawn. As is true of the compiler 42, the virtual-machine process 50 may be specified by code stored on a local disk or some other machine-readable medium from which it is read into FIG. 1's RAM 14 to configure the computer system to implement the garbage collector and otherwise act as a virtual machine. Again, though, that code's persistent storage may instead be provided by a server system remote from the processor that implements the virtual machine, in which case the code would be transmitted by electromagnetic signals to the virtual-machine-implementing processor.

In some implementations, much of the virtual machine's action in executing these byte codes is most like what those skilled in the art refer to as "interpreting," so FIG. 4 depicts the virtual machine as including an "interpreter" 52 for that purpose. In addition to or instead of running an interpreter, many virtual-machine implementations actually compile the byte codes concurrently with the resultant object code's execution, so FIG. 4 depicts the virtual machine as additionally including a "just-in-time" compiler 54.

The resultant instructions typically invoke calls to a run-time system 56, which handles matters such as loading new class files as they are needed and includes much of garbage-collector implementation. The run-time system will typically call on the services of an underlying operating system 58. Among the differences between the arrangements of FIGS. 3 and 4 in that FIG. 4's compiler 40 for converting the human programmer's code does not contribute to providing the garbage-collection function; that results largely from the virtual machine 50's operation.

Independently of the specific system-architecture levels at which the collector resides, garbage collection usually includes some amount of reference tracing to determine whether objects are at least potentially reachable; if they are not potentially reachable, they are garbage, and their memory space can therefore be reclaimed. The most straightforward and accurate way to do the tracing is to start at the root set and scan recursively for referred-to objects until all have been identified. If an object is not encountered in that process, it is not reachable, even if it is referred to by a reference in some other object.

Now, it would be unacceptable in many applications to have the mutator pause while the collector traces references through the whole heap. So some garbage collectors perform the tracing in threads of execution that (mostly) operate concurrently with the mutator. They mark the objects thereby encountered, and, possibly with some exceptions, objects that remain unmarked at the end of the marking operation can be recognized as garbage. The memory blocks occupied by thus-recognized objects can be reclaimed concurrently with mutator execution. Since most of such a marking-and-sweeping operation executes concurrently with mutator execution, this approach limits pause times. For large heaps, though, the marking is expensive, and it can slow mutator execution.

Another solution is for the garbage collector to operate "space-incrementally." In each successive collection increment, which typically (but not necessarily) is all performed during a single pause in mutator execution, the collector considers a small portion, or collection set, of the heap. As the mutator executes, it notifies the collector when it writes a reference, and the collector thereby maintains, for each of a plurality of heap regions, a list, or remembered set, of locations in other regions where the mutator has reported references to that region's objects. Without tracing reference chains from the basic root set throughout the entire heap during every collection increment, the collector can recognize a collection-set object as unreachable if no reference to it resides in any location that the collection-set regions' remembered sets identify.

Although incremental collection helps to limit pause times, collector overhead remains significant, and a great amount of effort has been expended in improving collector efficiency.

SUMMARY OF THE INVENTION

We have developed a way of enhancing efficiency. It applies to the so-called garbage-first approach to collection. In that approach, the collector estimates for various heap regions how efficient their collection is likely to be, and it chooses for collection-set membership from among those that by that standard appear most attractive. Because of interim mutator activity, the regions' relative collection efficiencies tends to change between increments. But we have recognized that as a practical matter the best heap regions can be selected without basing each increment's collection-set selection on estimates newly made for all not-yet-collected regions at the time of that increment. Instead, although we do from time to time sort regions based on such a set of estimates, we use the result of such a sorting as a basis on which to select subsets from which collection-set selections are made for several successive increments.

BRIEF DESCRIPTION OF THE DRAWINGS

The invention description below refers to the accompanying drawings, of which.

DETAILED DESCRIPTION OF AN ILLUSTRATIVE EMBODIMENT

The mutator with which the illustrated embodiment is employed is preempted from time to time for collection intervals during which, as will be explained below, the collector collects the heap incrementally. For at least some of the collection increments, the collector chooses the portion of the heap to be collected by selecting one or more heap regions from among a plurality of heap regions into which it treats some or all of the heap as divided. In at least some cases, it bases the selection of that "collection set" of heap regions on, among other things, the results of a "marking" operation that the collector has completed at some time in the past.

Basically, the marking operation identifies, or marks, the objects that were reachable when the marking operation started, and objects that were in existence at that time but have not been marked by the time the marking operation has been completed can be recognized as garbage. Everything else being equal, a heap region thus found to contain the more garbage is a more attractive candidate for collection-set membership than one that contains less garbage.

Although other embodiments may perform marking more selectively, the illustrated embodiment performs the marking operation on the entire heap. This is a time-consuming operation, and in most applications it will be impractical to interrupt the mutator for a collection interval long enough to perform a complete marking operation. Instead, the illustrated embodiment performs the marking largely concurrently with mutator operation.

Figure 1:
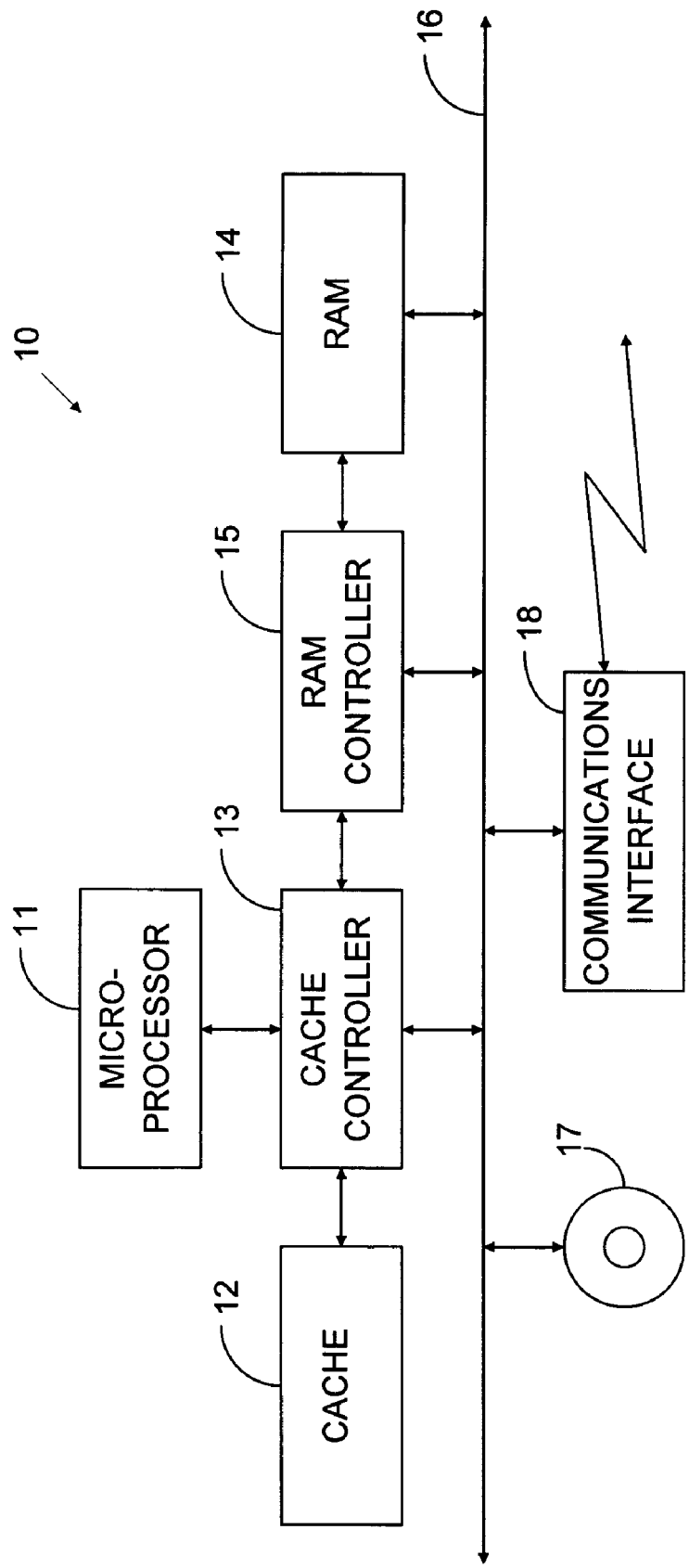
FIG. 1 is a block diagram that illustrates a typical computer system in which the present invention's teachings may be practiced.
Figure 2:
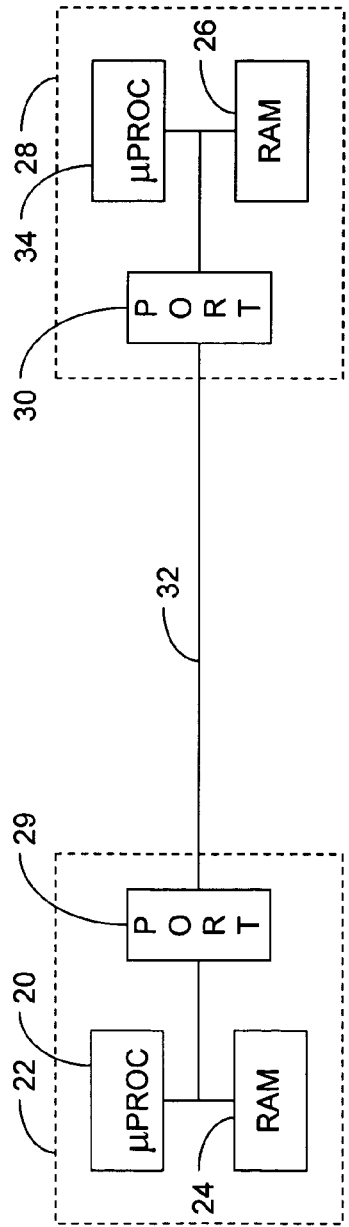
FIG. 2 is a block diagram of a multiprocessor computer system, which can also use the present invention's teachings.
Figure 3:
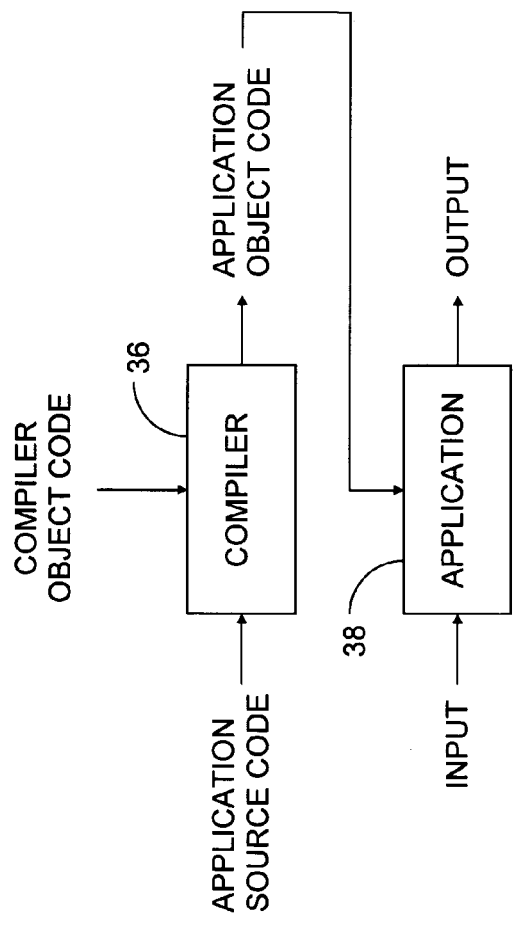
FIG. 3 is a block diagram that illustrates the relationship between a compiler and the resultant application program.
Figure 4:
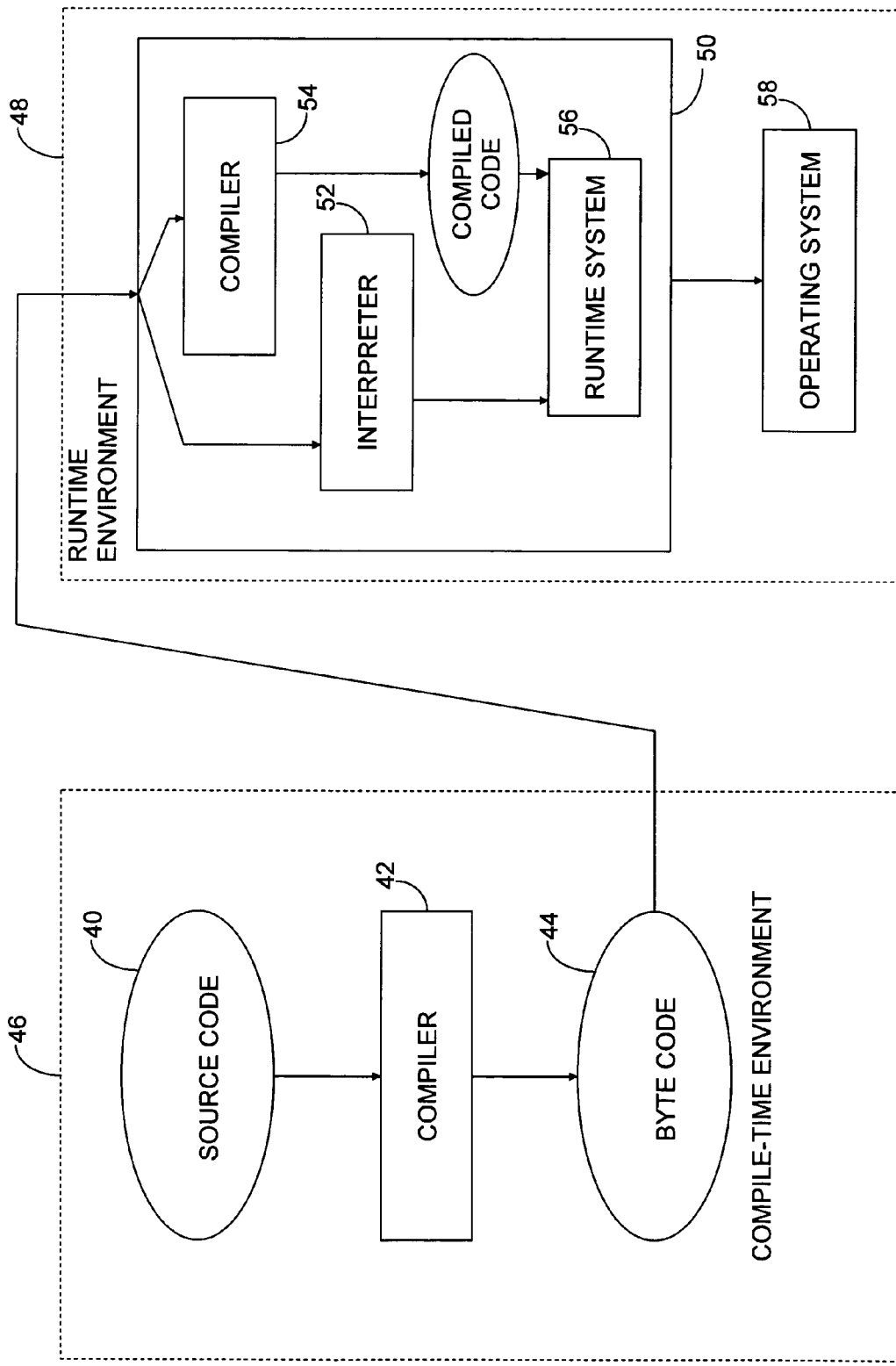
FIG. 4 is a block diagram that illustrates another way in which source code can result in an executing program.
Figure 5:
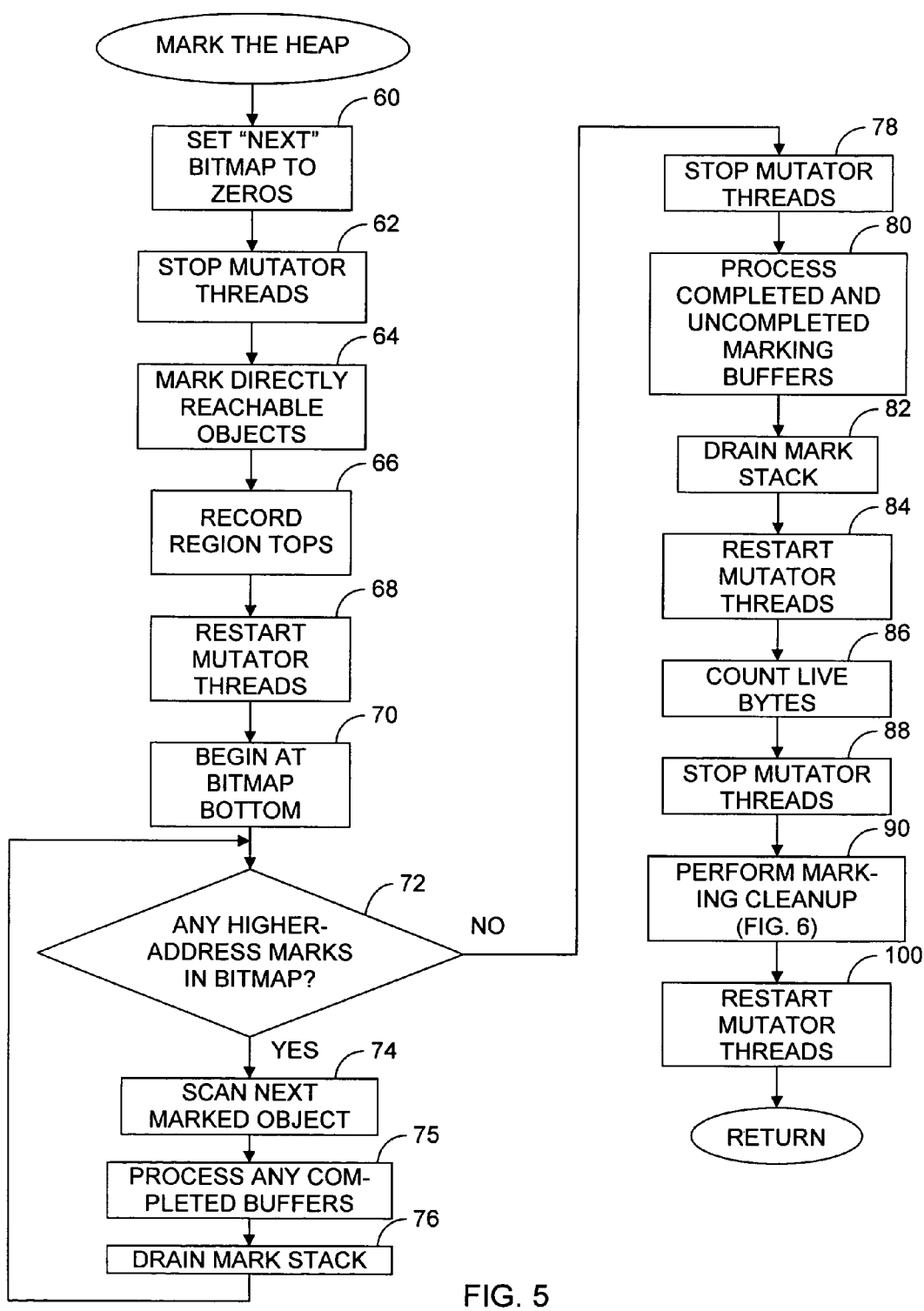
FIG. 5 is a flow chart of an exemplary marking operation.

FIG. 5 illustrates in a simplified fashion one approach to doing so. The marking technique used in that approach is to employ a bitmap containing a respective (typically but not necessarily single-bit) entry for each location in the heap where the system's alignment rules would permit an object to start. A "mark" in a given entry indicates that a reachable object begins in the corresponding location. Since the collector infers that an unmarked object is garbage, the marking operation must be completed if such inferences are to be correct. But the marking and concurrent mutator operation are interrupted from time to time by collection operations that need to use marking results to identify garbage: the collector may need to use the results of one, completed marking while a subsequent marking is still in progress.

The collector therefore employs two marking bitmaps. One, "current-marking" bitmap contains the results of the last completed marking, and the other, "next-marking" bitmap contains the (partial) results of any marking operation currently in progress. Block 60 represents setting all of the next-marking bitmap's contents to zeros to indicate that the marking about to commence has not yet found any objects to be reachable. The marking operation begins with visiting references in the registers, call stacks, etc., so the marking operation needs to be able to distinguish references in those sources from non-references. To this end, it calls upon all threads to suspend themselves, as block 62 indicates, and they do so at "safe points," i.e., at instructions for which the compiler has created stack maps that tell where references reside in the stack and registers. (Although it is the mutator threads that FIG. 5 refers to as being suspended or resuming, some collector threads, too, may operate during the intervals between such resumptions and suspensions.) As block 64 indicates, it marks all locations referred to by the root-set references thus identified: it sets to $1_2$ the corresponding bits in the next-marking bitmap.

When the current marking has been completed, it will be reliable as to all objects still located where they were when the marking started: any such object that is not marked can reliably be considered garbage. The same is not true of, for example, objects that were allocated since the marking started. To facilitate distinguishing between the two, the collector adds objects to regions contiguously, and each region's metadata include a "top" field to identify the location where the next object to be allocated in the region should be placed. At the beginning of a marking operation, in an operation that block 66 represents, the collector copies each region's top-field contents into another metadata field, its next-top-at-mark-start field, to record the boundary between the objects residing in that region at the beginning of the marking and those that arrived later. The region's metadata also include a previous-top-at-mark-start field, which holds similar information for the previous marking operation.

Having thus completed its use of the stack maps and recorded the values that the regions' tops had at the start of the marking, the marking operation signals the mutator threads to resume execution, as block 68 indicates. Most of the marking operation then proceeds concurrently with mutator execution.

In the illustrated embodiment, the marking operation's concurrent part begins at the bottom of the next-marking bitmap, as block 70 indicates, and proceeds upward, as block 72 indicates, to find each bit location that contains the reachability-indicating value ($1_2$ in the illustrated embodiment). When the collector finds such a location, it records the corresponding heap location in a "finger" variable, which it uses to remember its place in the process. As block 74 indicates, it then takes the first step in tracing the reference chain from each reference contained by the object whose head is at the just-found marked location.

Specifically, it marks the location of every object to which a reference in the finger-indicated object refers. Those objects' references will need to be traced, too, and that will happen in subsequent loops through the block-74 operation if such referred-to objects addresses are above the finger value. To make sure that it traces reference trees rooted in any referred-to objects whose addresses are below the finger value, the collector places identifiers of such objects in a mark stack.

Now, one way in which to look at the concurrent-marking operation is that it takes a "snapshot" of the reference chains as they existed when the marking operation began. Since the mutator executes concurrently with the marking thread, though, it can write over some references that existed when the marking started. To prevent the collector from losing track of those references, mutator threads write into respective marking buffers the values of any references they write over. When a thread fills its marking buffer, it places it in a completed-marking-buffer queue. If there are any such enqueued buffers when the marking thread has finished the block-74 operation, that thread processes the written-over references that such buffers identify. Block 75 represents this operation.

The collector then proceeds to "drain" the mark stack, as block 76 indicates. That is, it pops objects from the mark stack, marks the objects referred to by the popped objects' references, and, if the thus-referred-to objects' addresses are below the finger value, places them on the mark stack. When it has thereby exhausted the mark stack, the collector advances up the bit map, marking in the fashion just described, until it has thus processed all the bitmap's marks.

When the marking thread has finished repeating the loop represented by blocks 72, 74, and 76, it stops the mutator, as FIG. 5's block 78 indicates, and, as block 80 indicates, it traces the reference chains that originate in the objects to which written-over references refer, even if the marking buffers that list them are not yet full. As was explained above, tracing references typically involves in pushing onto a mark stack some of the references thereby encountered, so, as block 82 indicates, the marking thread thereafter drains that stack again.

At this point, the marking thread has marked all of the reachable objects that reside where they did when the marking started, so it can allow the mutator to resume, as block 84 indicates, while it counts how many "live" bytes, i.e., bytes occupied by objects that were reachable when the marking operation began, each region contains. When the collector has completed the concurrent live-byte counting, which block 86 represents, it needs to suspend the mutator threads for a final, cleanup operation, as blocks 88 and 90 indicate.

Figure 6:
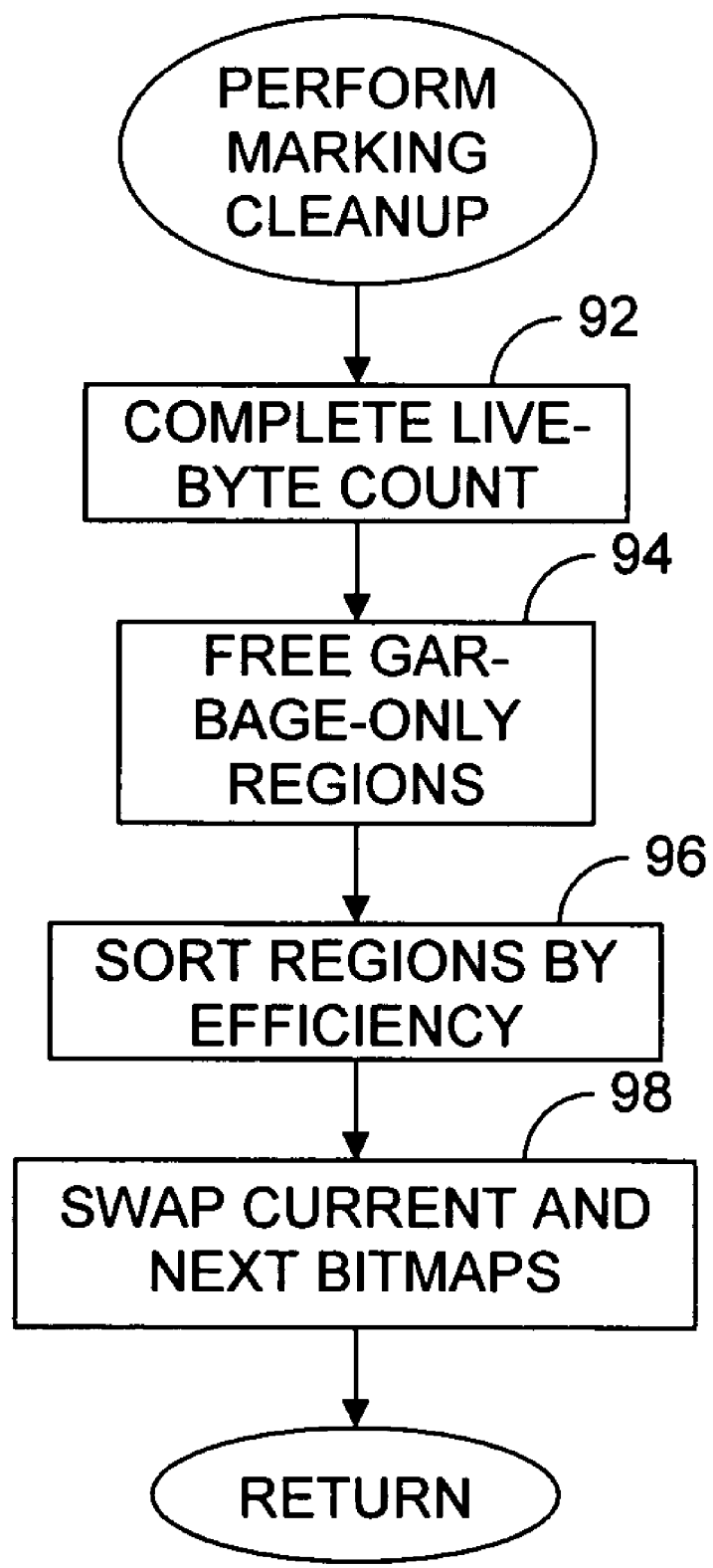
FIG. 6 is a flow chart of a clean-up operation included in the marking operation of FIG. 5.

FIG. 6 depicts the cleanup operation. Now, collector copying can interrupt the marking thread's concurrent operations. In such a copying operation, the collector typically copies reachable objects into some regions above what had been those regions' tops, and the illustrated embodiment moves the evacuated objects' marks with them: it preserves their marks. If this happens during the concurrent counting that FIG. 5's block 86 represents, the maximum-live-byte value will have changed. So the marking thread completes the live-byte count while other threads are suspended, as FIG. 6's block 92 indicates.

In the process of counting regions' live bytes, the marking thread may encounter regions for which the maximum number of live bytes is zero, i.e., regions that are all garbage. Those regions can be reclaimed forthwith, without evacuating reachable objects, so the marking thread does so, as block 94 indicates. As block 96 indicates, the marking thread then sorts the regions in accordance with a measure, explained below, of how attractive they are likely to be as collection-set members.

Since the marking is complete, the next-marking bitmap in which the marks were made can now be used reliably to identify unreachable objects, so the collector adopts it, as block 98 indicates, as the bitmap to be used for that purpose in subsequent collection operations. The erstwhile current-marking bitmap will be cleared and used as the next-marking bitmap for the next marking operation.

As FIG. 5's block 100 indicates, the mutator threads then resume, and the marking operation is over. As will now be explained, the collector will then use the marking operation's results in subsequent collection increments until the collector finds that its collection efficiency has fallen too low.

As was mentioned above, the collector performs its unreachable-memory reclamation in increments, in which it collects respective collection sets. As was also mentioned above, one of the ways in which the collector threads involved in that effort identify objects as potentially reachable is to find references to them in locations that the collection-set regions' remembered sets specify. We will refer to those threads as the "copying" threads because the illustrated embodiment is a copying collector: it copies to non collection-set regions the collection-set objects whose reachability it cannot rule out. In that way, it can reclaim entire collection-set regions and tend to compact the heap.

Figure 7:
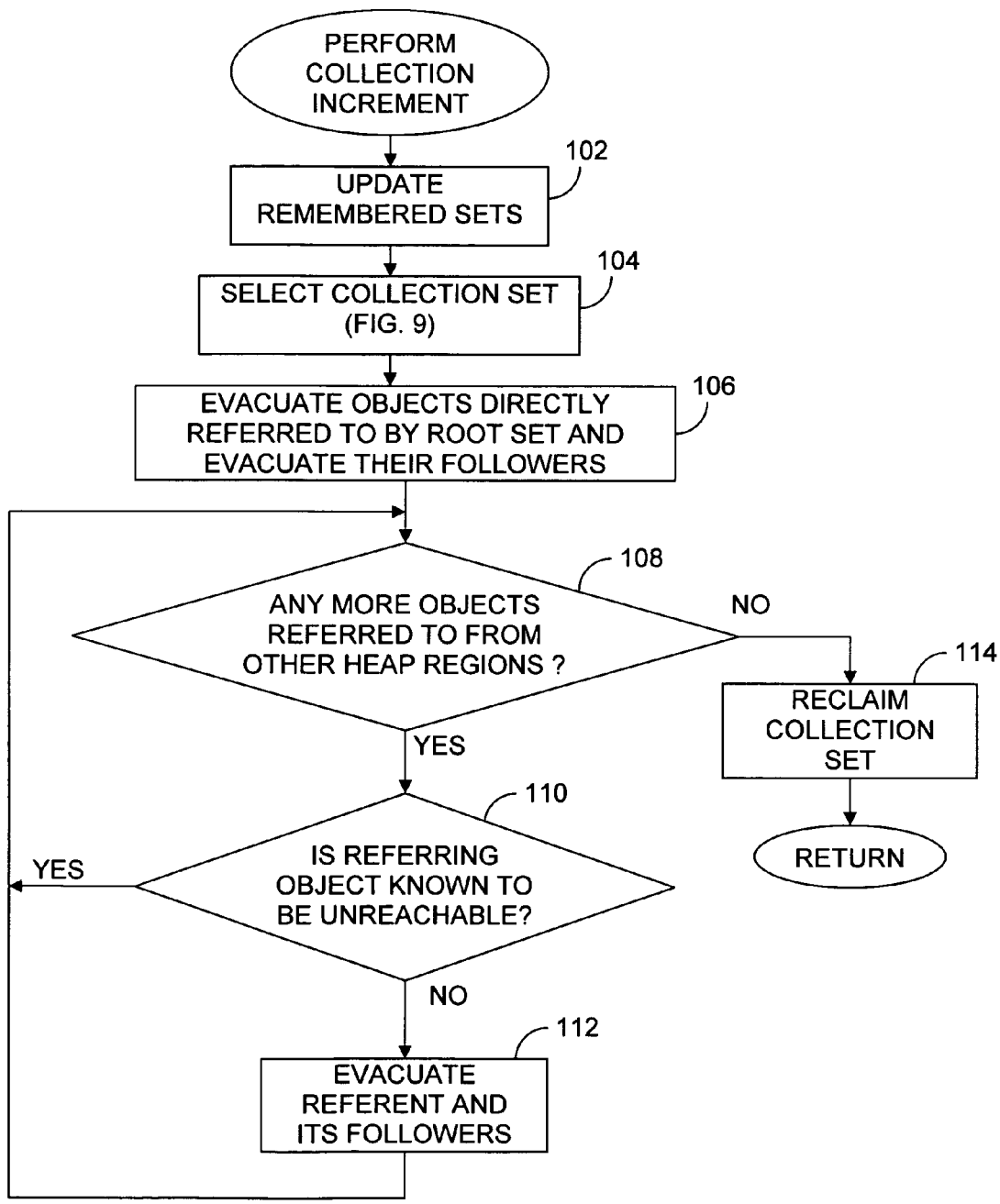
FIG. 7 is a flow chart of a routine for performing a collection increment.

FIG. 7 depicts in simplified form a collection increment executed in a single interval dedicated to that collector's activity to the exclusion of the mutator's. It is in such intervals that the copying threads principally operate. Now, although the mutator could report its reference writing by installing entries into the remembered sets, it does not do so in the illustrated embodiment. Instead, it merely maintains some type of reference-write log to indicate where it has written references, and it is up to the collector threads to place identifiers of those locations into the appropriate remembered sets. In the illustrated embodiment, a collector thread does some of that installation concurrently with mutator operation, but there may be some installation activity left to do when the collector pause begins, and block 102 represents that remaining installation activity. Block 104 represents then selecting the collection set in a manner that will be described presently, and block 106 represents evacuating from the collection set its objects that are reachable directly from the root set. It also represents evacuating the evacuated objects' followers, i.e., evacuating the collection-set objects to which references in those objects refer.

The copying threads then loop through the operations that blocks 108, 110, and 112 represent. Block 108 represents determining whether the locations that the remembered sets identify still contain references to collection-set objects. For any reference that it thereby finds, the collector attempts to rule out the reachability of the object that contains it, as block 110 indicates. Specifically, it determines whether that object resided in its current location—or in a location from which it was evacuated to its current location—when the last marking operation started. If it did not, or if it did but was not marked as a result, then the collector cannot conclude that the reference-containing object is unreachable, so it must consider the referred-to collection-set object as potentially reachable, too. As block 112 indicates, it therefore evacuates that object and its followers from the collection set. When it has thereby evacuated all potentially reachable objects from the collection set, it reclaims the collection set, as block 114 indicates; i.e., it places its regions in the list of memory blocks that can be overwritten with new objects.

Note that the number of times the collector has to repeat the loop of blocks 108, 110, and 112 depends on the sizes of the collection-set regions' remembered sets: if the remembered sets are large, reclaiming the collection set will require the collector to do a lot of searching for references. Also, although evacuating a reachable collection-set object frees space in the collection set, it consumes an equal amount of space elsewhere. So, if the collector cannot recognize many of the collection set's bytes as occupied by unreachable objects, it will have to perform a relatively large amount of evacuation without much of a net gain in free memory space. So the collector performs block 104's collection-set-selection operation in such a way as to minimize these costs.

It does this by estimating for each object-containing region in the heap, or in at least in some significant portion of the heap, how efficient that region's collection is likely to be. There are many ways that embodiments of the present invention can estimate efficiency. The way in which the illustrated embodiment does so is based primarily on remembered-set size and the results of the last completed marking operation.

For example, the cost of a given collection increment may be estimated by, say, $$V(cs) = V_{fixed} + U \cdot d + \sum_{r \in cs} (S \cdot rsSize(r) + C \cdot liveBytes(r)),$$

where V(cs) is the cost of collecting collection set cs, $V_{fixed}$ represents fixed costs common to all pauses, d is the number of reference-write-log entries to be scanned to bring the remembered sets up to date, U is the average cost of doing so per entry, S is the cost per entry of scanning a remembered set, rsSize(r) is the number of entries in the remembered set maintained for region r, C is the cost per byte of evacuating and scanning a live object, and liveBytes(r) is an estimate of how many live bytes region r contains. Although some of that cost's constituents are independent of the collection-set regions' identities, the region-specific quantities can be used to compute a region-specific collection-efficiency metric E(r). One such metric could be computed in accordance with:

$$E(r) = \frac{totalBytes(r) - liveBytes(r)}{S \cdot rsSize(r) + C \cdot liveBytes(r)},$$

where totalBytes(r) is the number of bytes occupied by all of region r's objects, both reachable and unreachable. Since such a metric omits fixed costs, it is not very precise as a measure of how efficiently the collector is likely to collect a given region, but it gives a good relative-efficiency indicator; that is, it gives a good basis for judging how attractive the region is for inclusion in the collection set. In the operation that FIG. 6's block 96 represents, the illustrated embodiment therefore performs a general efficiency-computation operation in which it computes such relative-efficiency metrics for respective regions. In principle, the collector sorts the regions in accordance with those metrics, and it selects the regions with the highest efficiency metrics.

Now, remembered sets have to be updated in accordance with mutator activity that occurs between collection increments, so the efficiency metrics can change in those intervals, and so can the regions' efficiency order. Re-computing regions' efficiencies for successive collection increments, and re-sorting regions as a result, would therefore enhance the collection-set-selection operation's accuracy. But re-computing and re-sorting for the whole heap for every increment can be prohibitively expensive if the heap is large. We are able to obtain essentially the same result, but at only a fraction of the cost, by re-sorting only a subset of the regions for each increment.

Figure 8:
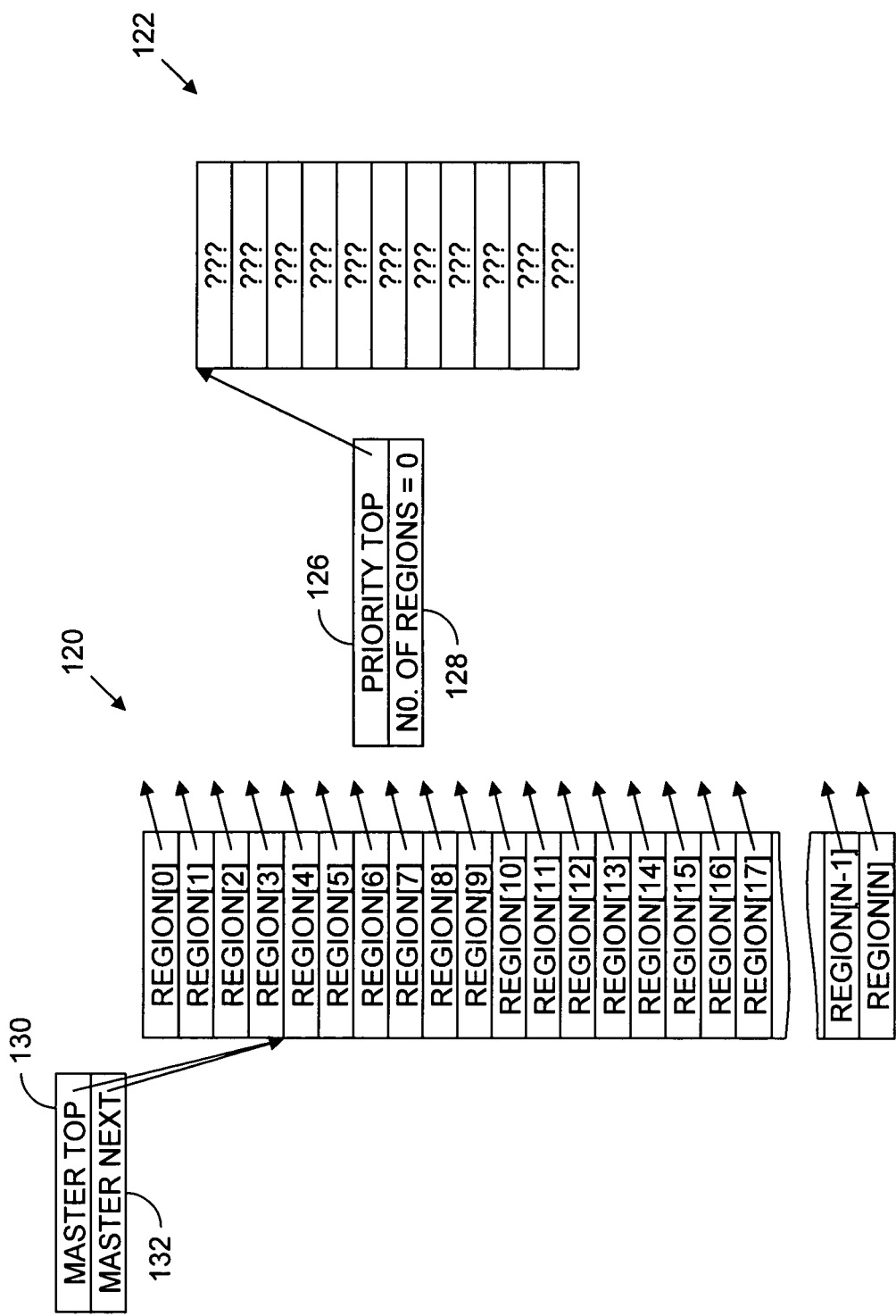
FIG. 8 is a data-structure diagram that illustrates arrays employed in selecting the collection set for the collection increment of FIG. 7.

FIG. 8 depicts an array 120 that the illustrated embodiment employs to store the results of the end-of-marking sorting operation that FIG. 6's block 96 represents. That operation sorts all of the regions in which objects were residing when the marking operation began. (Some embodiments that use the marking operation may apply it only to one or more "generations" of the heap, but not to all of it. In such embodiments, the block-96 sorting operation would typically be performed only on such regions in those generations.) The sorting is based on the results of the metric computation mentioned above as being performed for that sorting.

Although FIG. 8 depicts the sorting-operation results as an array 120 embodied in a single set of contiguous locations, some embodiments may use less-compact structures for that purpose. For example, the array's ultimate size may be unknown when the collector starts to fill it, and some techniques for providing for array "growability" so implement an array that some subsets of its slots are not in virtual-address terms contiguous to others. Also, the ordered list that results from the sorting operation need not take the form of an array at all. For example, it could instead be implemented in a binary tree structure, in which the left and right edges leaving a given node representing a given region would lead to nodes respectively representing higher- and lower-efficiency regions. And the sorting-result data for a node representing a given region could be stored in locations contiguous to some that contain other metadata for the same region.

For the sake of simplicity, though, the drawing depicts the sorting results as a compact array in which the array entries are identifiers of the sorted regions. As the drawing's arrows suggest, for example, those contents may be pointers, and those pointers may identify, say, structures where the collector stores metadata that it maintains for the respective regions.

As a practical matter, the array's entries need not be sorted completely; in the (important) case in which the number of regions to be sorted is large, it may be enough to perform the sorting only until the highest-efficiency regions are properly sorted. But even such a partial sorting of all the regions can be quite time-consuming. So, in accordance with the present invention, such a general sorting operation is not performed anew before every collection increment, of which very many typically occur between markings. Instead, the illustrated embodiment's collection-set-selection operation, which FIG. 7's block 104 represents, sorts only a relatively small subset consisting of the regions whose metrics were highest when the initial, all-region sorting occurred.

To that end, the illustrated embodiment employs a priority queue identified in FIG. 8 by reference numeral 122. Queue 122 has M slots, where M is a value much smaller than the size to which the array 120 can potentially grow. How much smaller it should be is not critical, but the present invention's advantages result only if it is smaller than array 120's size in at least some increments. As a practical matter, we believe that it will be no more than a few tens of entries in most embodiments, since we think it will be rare for the use of a larger priority queue to provide any appreciable improvement in the collection-set selection.

Figure 9:
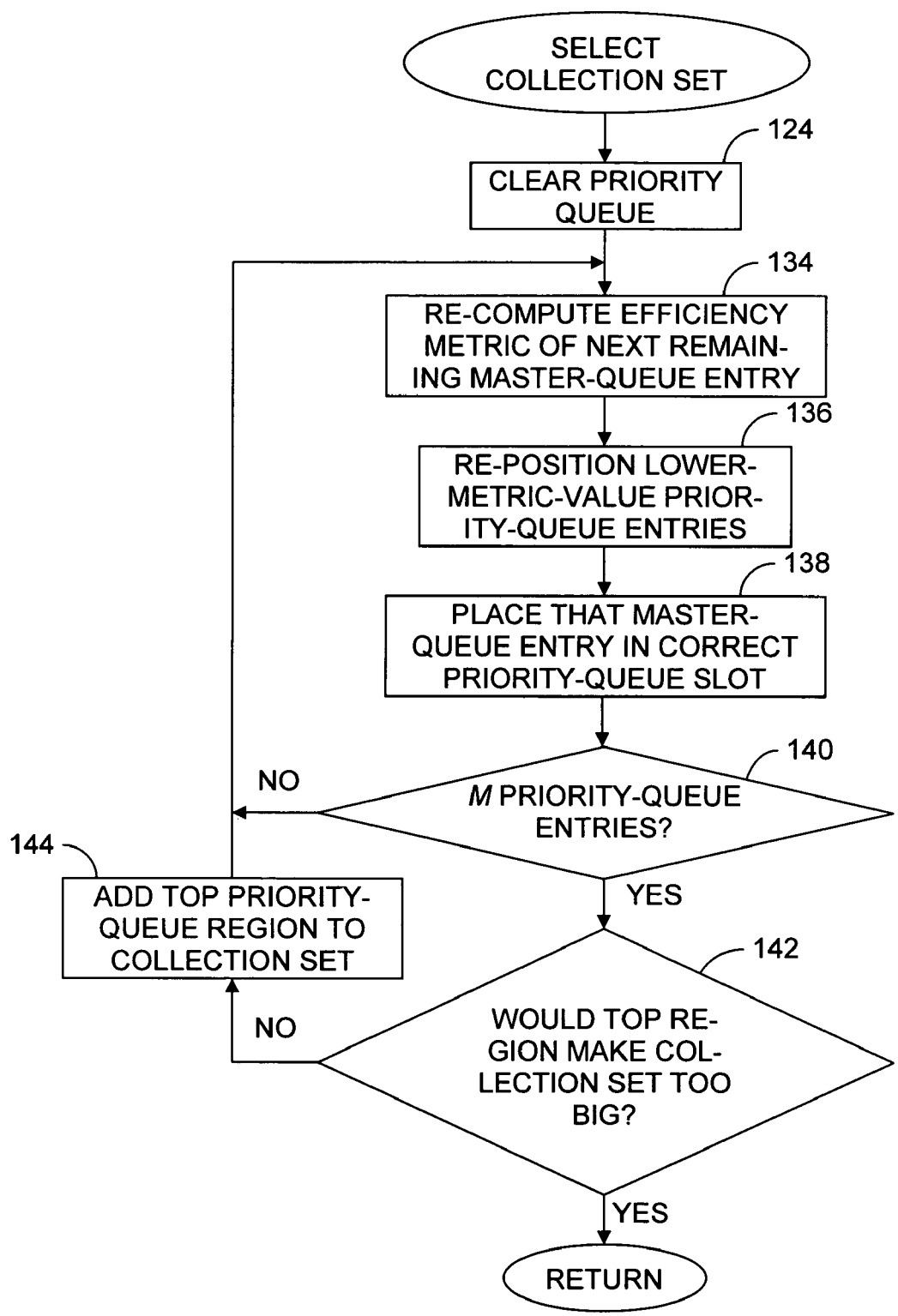
FIG. 9 is a flow chart of the routine used to select the collection set for the collection increment of FIG. 7.

At the beginning of each collection increment, the collector empties that queue in an operation represented by block 124 of FIG. 9, which depicts the selection operation represented by FIG. 7's block 104. To reflect the resultant empty state, FIG. 8 depicts the priority queue's top-index field 126 as pointing to the top slot and its number-of-entries field 128 as containing a zero value. As will be described presently, the priority queue 122 will be filled with entries from the master array 120. For this purpose, the drawings depict the collector as maintaining for the master array 120 an index field 130, which identifies as the master array's current top the element that represents the highest-efficiency-metric region not previously claimed for collection by some previous collection increment, and another index field 132, which identifies the highest such remaining element that the priority queue does not yet contain.

As will now be explained by reference to FIG. 9's blocks 134, 136, 138, and 140, the collector initializes the priority queue by selecting successive entries from the top of the master array 120 until it has filled the priority queue with the master array 120's first M remaining entries. So selection of the priority queue's entries is based upon the original relative-efficiency metrics. Once those entries have thus been chosen, though, the garbage collector re-computes their metric values, as block 134 indicates, to take into account any changes in remembered-set size, and it sorts the list in accordance with the re-computed values.

We digress at this point to note that the re-computing represented by block 134 may itself employ data that are not completely up to date. Although FIG. 7's blocks 102 and 104 depict the collection-set selection as occurring after the remembered sets are updated, there are reasons why that order may be reversed in some embodiments. In multi-threaded implementations, for example, different garbage-collector threads may concurrently be updating the remembered sets, scanning the remembered sets to identify references to collection-set objects, and copying reachable objects out of the collection set. In such a situation, the collection set will have to have been selected—and the efficiency metrics will therefore have to be re-computed—before remembered-set updating has been completed. So the remembered-set size used in the re-computation represented by FIG. 9's block 134 may actually reflect only the results of the previous increment's remembered-set updating, not the current increment's.

Figure 10:
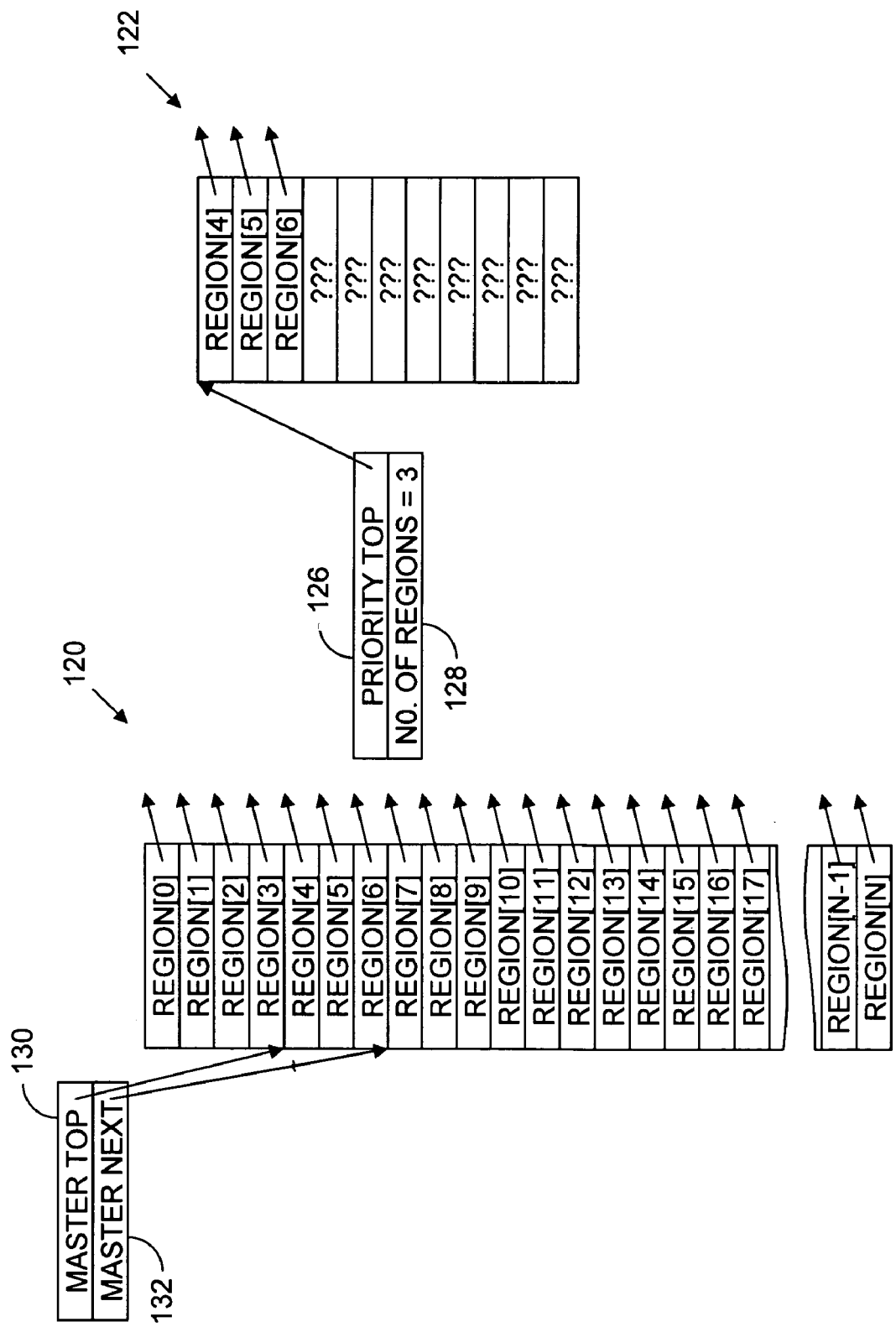
FIG. 10 is a data-structure diagram similar to FIG. 8 but showing a later stage in the selection operation.
Figure 11:
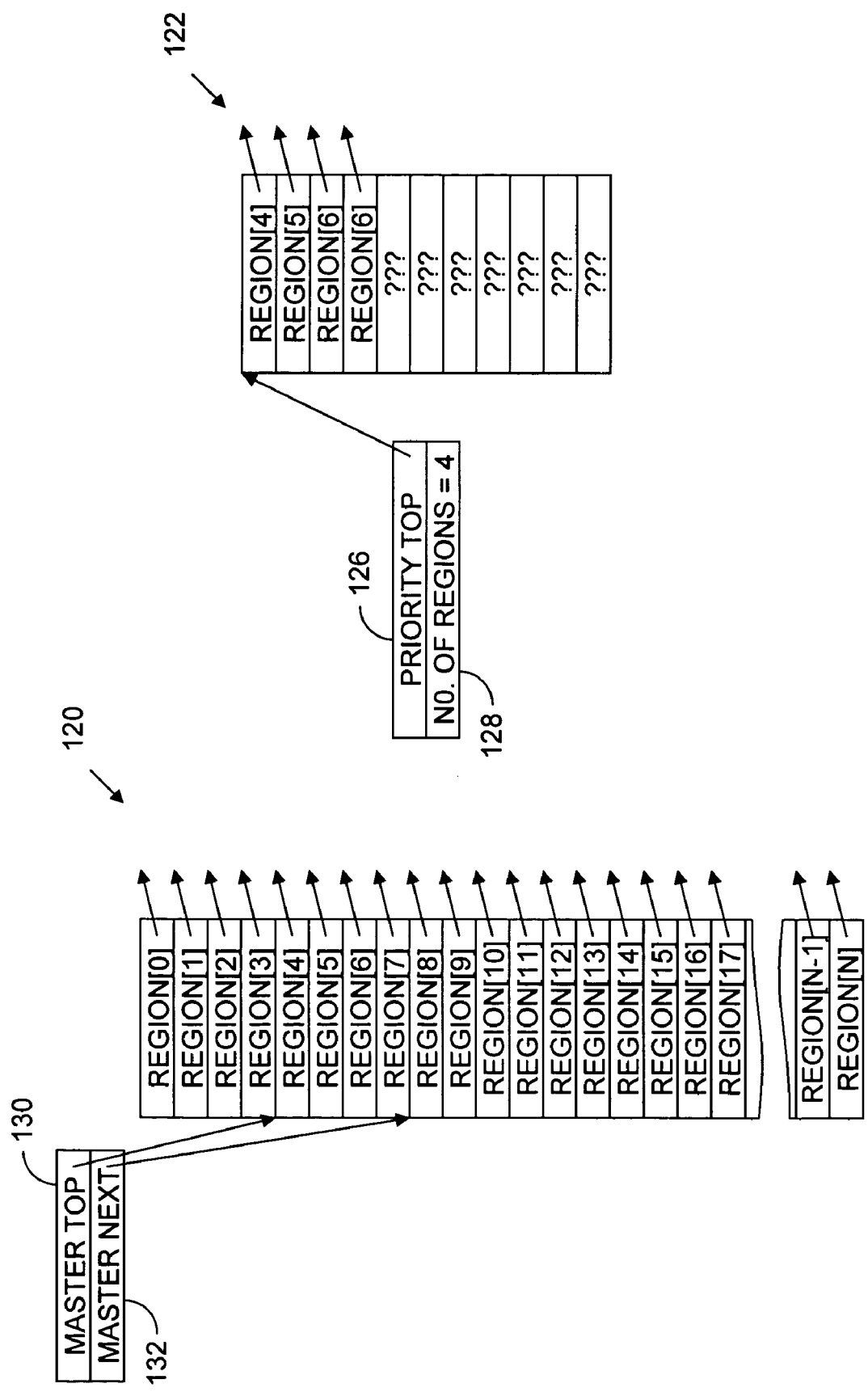
FIG. 11 is a data-structure diagram similar to FIG. 10 but showing a later stage in the selection operation.

In any event, the illustrated embodiment's priority-queue sorting results from repeatedly performing the repositioning operation that block 136 represents. FIGS. 10, 11, 12, and 13 illustrate that operation. FIG. 10 represents a state that would result from the collector's having added three entries whose relative order the metric-value re-computation has left unaffected. From this state, the collector selects the next entry (Region 7) from the master queue, re-computes its metric, and compares that metric with the metric that was computed for the bottom priority-queue entry (Region 6). For the sake of illustration, we assume that this time the metric of the entry to be added exceeds the bottom entry's, i.e., that the metric re-computation has reversed those the relative-efficiency order of Regions 6 and 7. When the collector observes such a reversal, it moves the bottom entry down one priority-queue position by copying it, with the result that FIG. 11 illustrates, to make room for an entry to be written over the contents of its previous position. We will therefore consider that position to be a temporary gap in the array-region efficiency order. (Some embodiments may avoid such copying of displaced region identifiers by instead employing, say, a doubly-linked list; as is true of the data structure that the master array 120 exemplifies, the data structure employed for the priority queue need not take the illustrated form.)

Figure 12:
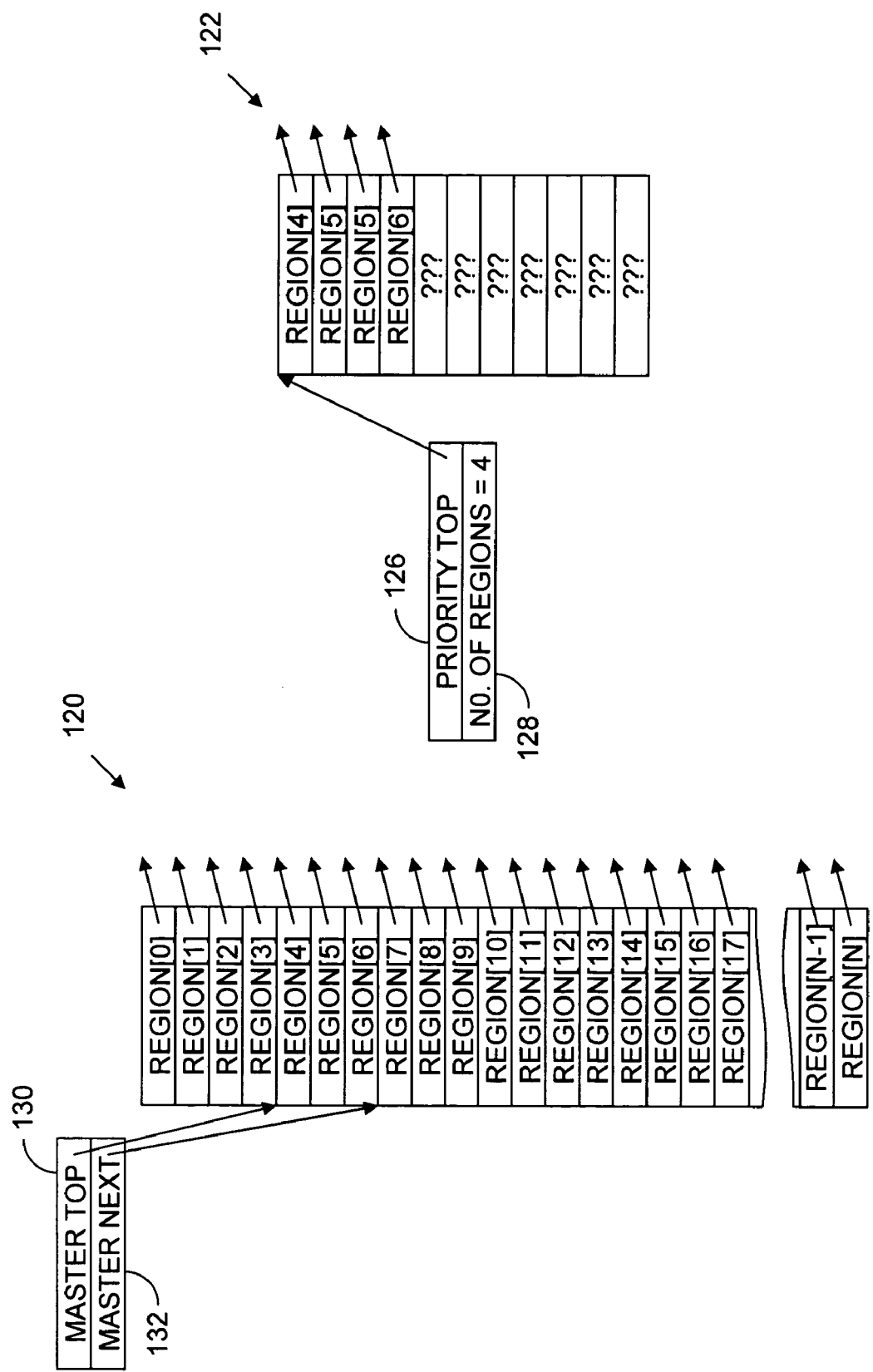
FIG. 12 is a data-structure diagram similar to FIG. 11 but showing a later stage in the selection operation.
Figure 13:
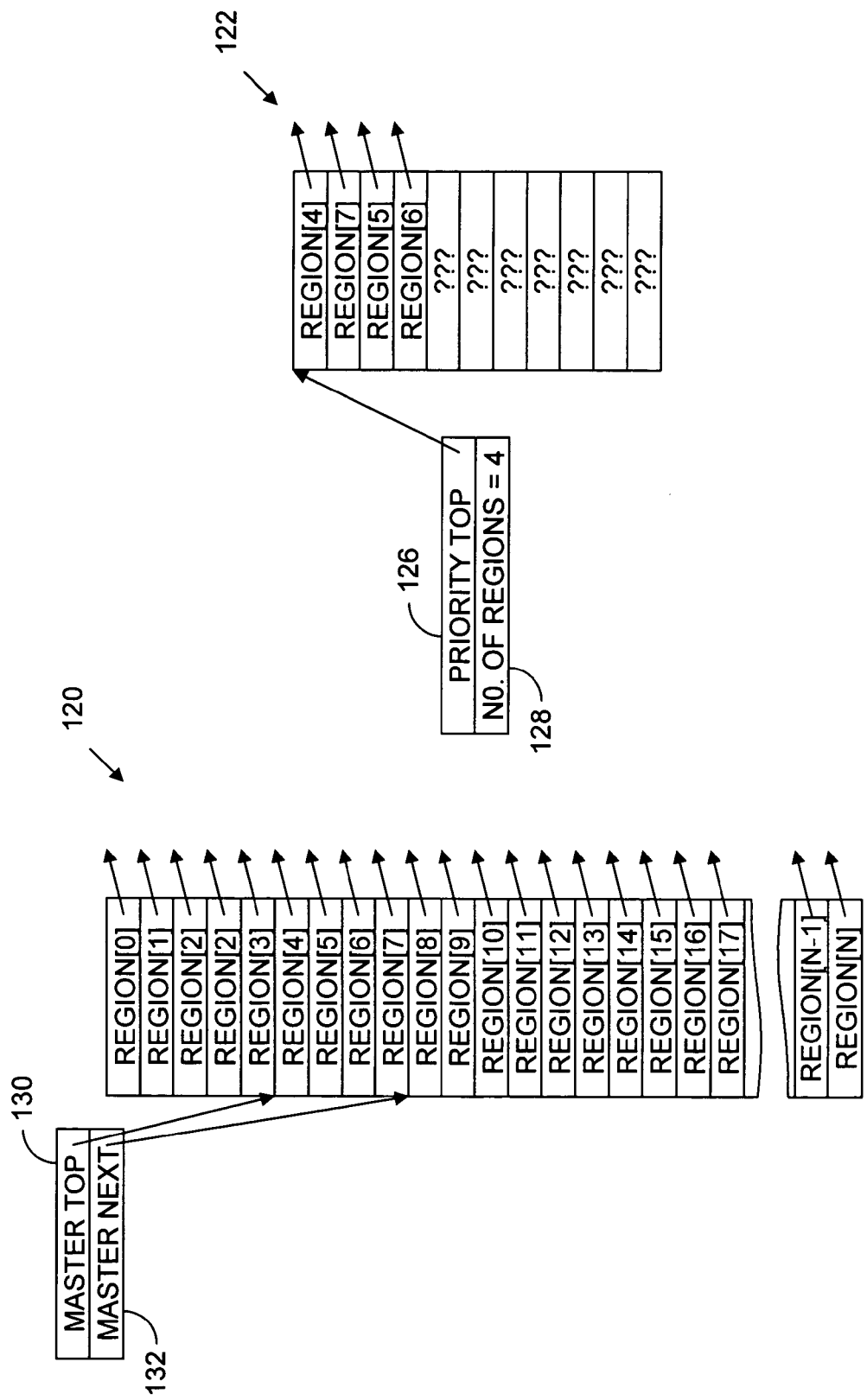
FIG. 13 is a data-structure diagram similar to FIG. 12 but showing a later stage in the selection operation.

The collector then compares the metric of the entry to be added with the entry above that gap, i.e., with the entry that represents Region 5. For the sake of explanation, we will assume that the metric of the entry to be added exceeds that existing entry's metric, too. So that entry is moved downward, too, with the result that FIG. 12 depicts. But we will assume that the metric for the entry (Region 4) now above the gap exceeds that of the entry to be added, so the collector does not move that entry down. Instead, it writes the new entry (Region 7) into the gap, with the result that FIG. 13 depicts. That completes the operation that FIG. 9's block 138 represents.

Figure 14:
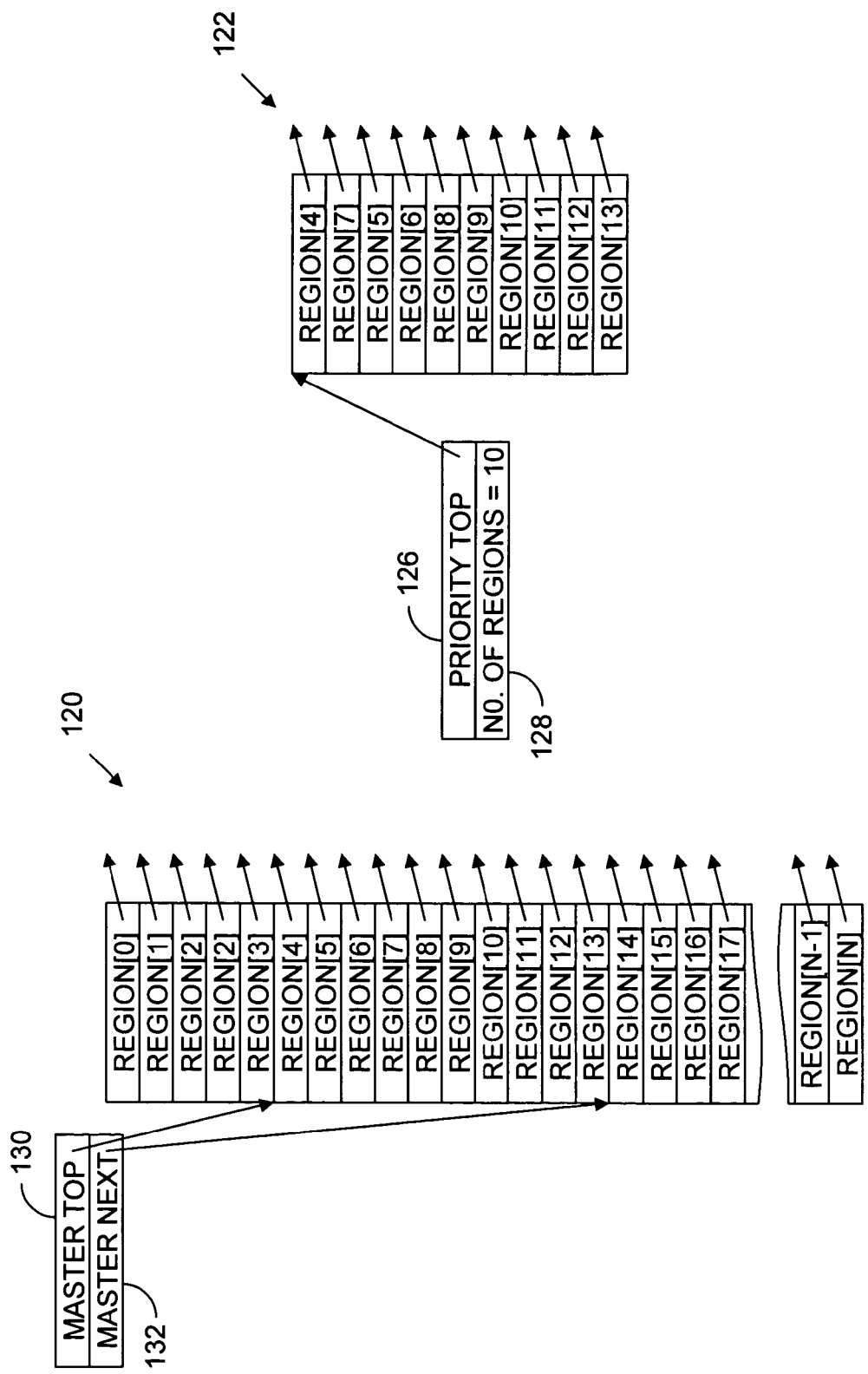
FIG. 14 is a data-structure diagram similar to FIG. 13 but showing a later stage in the selection operation.

As block 140 indicates, these operations of re-computing and sorting continue until the number of priority-queue entries reaches M. FIG. 14 depicts a possible resultant state for M=10. When the number reaches M, the collector begins selecting collection-set regions by popping regions from the top of the priority queue. As FIG. 9's block 142 indicates, it first determines whether adding the top region would make the collection set too big. What constitutes "too big" depends on the particular policies that the collector imposes, but it usually means that adding the region would result in an estimated collection pause that exceeds some acceptability threshold. As FIG. 9 indicates, the collection-set-selection operation has been completed if adding the top region is not by that criterion permissible.

Figure 15:
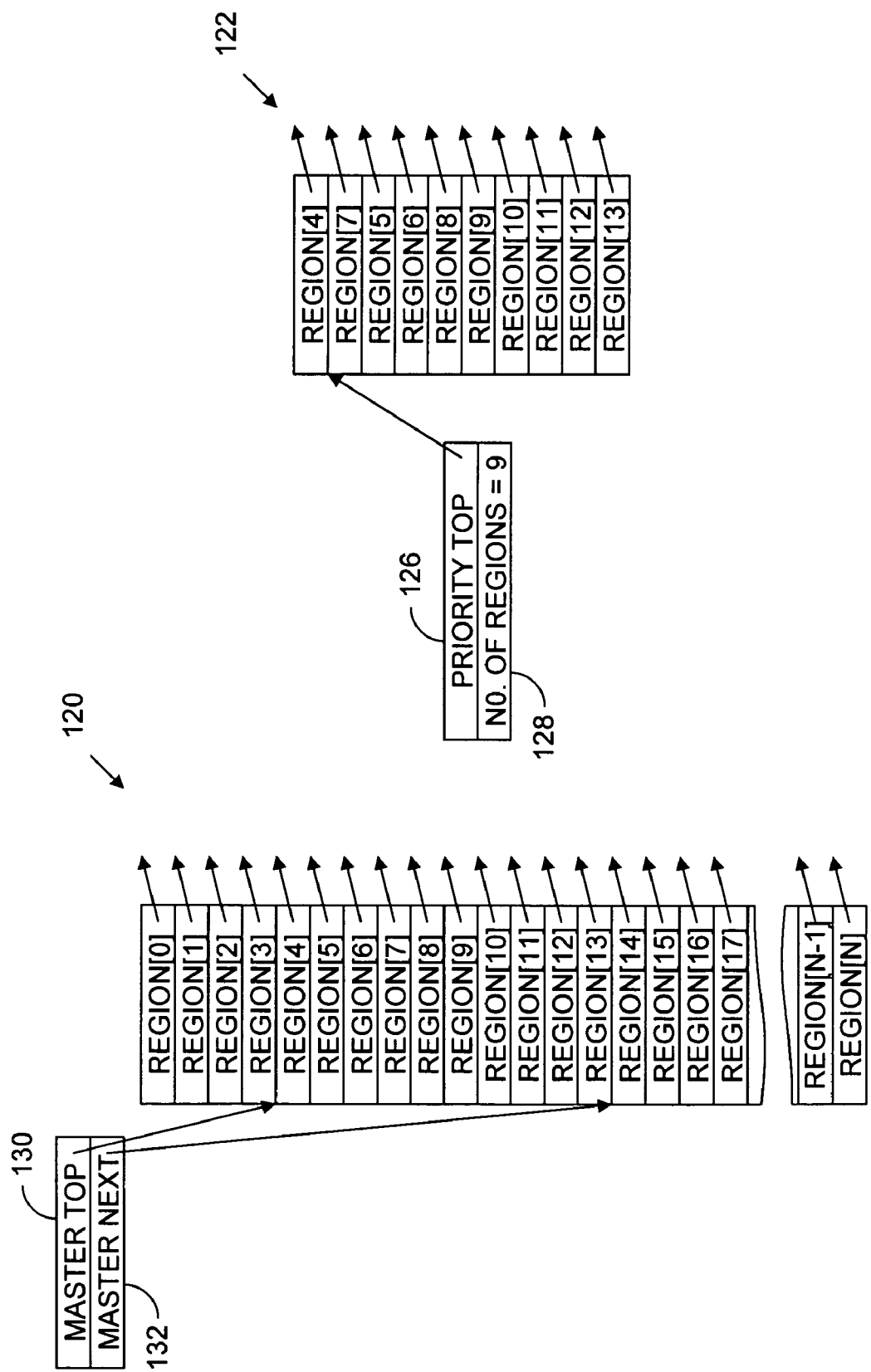
FIG. 15 is a data-structure diagram similar to FIG. 14 but showing a later stage in the selection operation.
Figure 16:
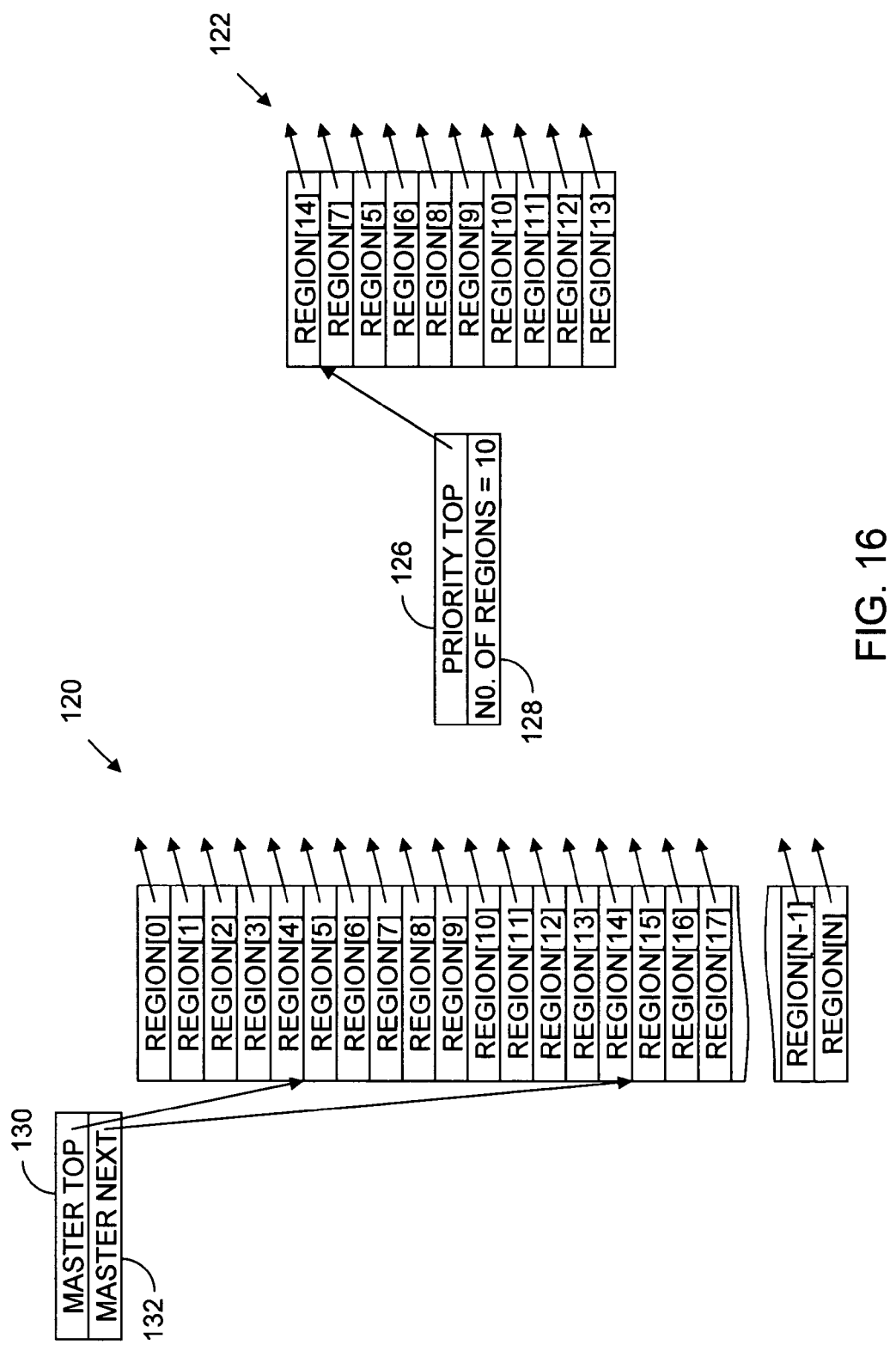
FIG. 16 is a data-structure diagram similar to FIG. 15 but showing a later stage in the selection operation.

As block 144 indicates, the collector otherwise pops the region from the top of the priority queue and adds it to the collection set. FIG. 15 depicts the result. The collector then replenishes the priority queue by adding another entry in the usual manner, i.e., by re-computing the new entry's efficiency metric and positioning it in the queue in accordance with that metric's relative value, before attempting to pop the resultant top region from the queue for inclusion in the collection set. FIG. 16 depicts a possible result. It also shows that the illustrated embodiment implements the priority queue as a circular queue: slots logically below the top slot can precede and succeed it in virtual-address order simultaneously.

When the collection set has been selected, entries remain in the priority queue that have not been chosen for the collection set, and these can be candidates for the next increment's collection set. So the priority queue could be left as it is between increments and not restored to the initialized state of FIG. 8 at the beginning of the next increment's collection-set-selection unless a new marking is completed in the interim. Or it could be initialized anew at the start of every increment's collection-set-selection operation, as described above, with the master-next field 132's value being reset to equal the master top's. An embodiment that we have employed does initialize the priority queue each time as described above, but it nonetheless retains the results of the priority queue's re-sorting. At the end of an increment's collection-set-selection, that embodiment, which employs only the master-next field, not the master-top field, copies priority queue's entries back into the master array, adjusting the master-next field's contents in the process.

As was stated above, this sequence of popping the top region and replenishing the queue by re-computing and re-positioning continues until the collection set includes as many regions as collector policy permits. At that point, the collection-set-selection operation that FIG. 7's block 104 represents is complete, and the collection increment continues. Successive collection increments will select their collection sets similarly, re-computing and re-sorting only the regions whose identifiers are copied from the master array into the priority queue. The master list will thereby tend to lose its most-attractive candidates, and the value of the best remaining efficiency metric will fall to a level that triggers another marking operation. When that marking is completed, the priority queue's entries will be selected from the resultant array.

Those skilled in the art will recognize that the present invention's teachings can be employed in many embodiments that differ significantly from the one illustrated here. For example, some embodiments may replenish the priority queue only at the beginning of the collection-set-selection operation, not every time another region is added to the collection set. Indeed, some may replenish it only once every several collection increments. Moreover, although the illustrated embodiment applies the present invention's teachings to selecting the entire collection set, some embodiments may not. Some embodiments, for example, may include in their collection sets all regions where newly allocated objects reside, and they may use the present invention's teachings only to add one or more older regions to the mix. Or they may use the results of the sorting only until the best efficiency metric falls to a certain level, after which they may use some other selection policy. Also, the efficiency metric need not be the specific one given above. In fact, there is no reason in principle why it needs to be based even in part on marking results and/or remembered-set size.

Nor is it necessary that the collector to which the present invention's teachings are applied needs to be of the copying variety. It is applicable to any collector in which collection sets are selected at least in part in accordance with an efficiency measure that benefits from being updated between collection increments. In short, the present invention is applicable to a wide range of collectors and is therefore a significant advance in the art.

What is claimed is:

1. A computer system comprising a memory with a heap and instructions stored on a computer readable storage medium configured to execute a mutator and a garbage collector, wherein the garbage collector is configured to:
   A) collect at least a portion of the heap in collection increments, in each of at least some of which the garbage collector collects a respective collection set that results from a respective collection-set-selection operation in which the garbage collector selects at least part of the collection set from among a plurality of heap regions into which the garbage collector treats at least that portion of the heap as divided;
   B) perform general efficiency-metric computations, in each of at least some of which the garbage collector computes a respective original efficiency metric representing a relative collection efficiency for every heap region in a relatively large plurality of the heap regions;

C) perform, between each of at least some pairs of consecutive ones of the general efficiency-metric computations, a plurality of the collection increments, for each of a plurality of which:
  i) the garbage collector performs a subset-selection operation, in which the garbage collector selects, from among the relatively large plurality of heap regions for which the garbage collector computed original efficiency metrics in the most recent of the general efficiency-metric computations, a relatively small heap-region subset in accordance with the original efficiency metrics thereby computed;
  ii) the garbage collector performs a re-computation of the efficiency metrics for only that heap-region subset; and
  iii) the collection-set-selection operation includes a metric-based collection-set-selection operation, in which the garbage collector selects a part of the collection set from the heap-region subset in accordance with the efficiency metrics recomputed in that re-computation; and
D) reclaim the part of the collection set selected from the heap-region subset for reuse by the computer system.

2. A computer system as defined in claim 1 wherein:
A) the garbage collector maintains remembered sets that are associated with respective ones of the heap regions and list locations in which references to objects in the heap regions associated therewith have been observed; and
B) the efficiency metric for a given heap region is based at least in part on the size of the remembered set associated therewith.

3. A computer system as defined in claim 1 wherein:
A) the garbage collector additionally performs marking operations by which the garbage collector identifies unreachable memory in the heap regions; and
B) the efficiency metric for a given heap region is based at least in part on the amount of unreachable memory that has thereby been identified in that heap region.

4. A computer system as defined in claim 3 wherein:
A) the garbage collector maintains remembered sets that are associated with respective ones of the heap regions and list locations in which references to objects in the heap regions associated therewith have been observed; and
B) the efficiency metric for a given heap region is based at least in part on the size of the remembered set associated therewith.

5. A computer system as defined in claim 1 wherein:
A) in each of at least some of the collection increments, the metric-based collection-set-selection operation performed for that collection increment includes selecting more than one of the heap regions from the heap-region subset for inclusion in the collection set; and
B) in at least some such collection increments, the subset-selection operation includes adding at least one further heap region to the heap-region subset after the garbage collector has selected one of the heap regions for the collection set and before the garbage collector has selected another of the heap regions therefor.

6. A computer system as defined in claim 5 wherein:
A) to list the priority subset, the garbage collector employs a priority queue that contains region identifiers logically positioned therein in order of recomputed relative collection efficiency from a top end, where a region identifier that identifies the heap region whose re-computed efficiency metric represents the highest of the priority subset's relative collection efficiencies is positioned, and a bottom end, where a region identifier that identifies the heap region whose re-computed efficiency metric represents the lowest of the priority subset's relative efficiencies is positioned; and
B) in at least some circumstances, the garbage collector adds a further heap region to the priority queue by:
  i) adopting the heap region represented by the region identifier at the bottom end of the priority queue as a current heap region, and
  ii) performing an efficiency-comparison operation in which:
    a) if the relative collection efficiency represented by the efficiency metric re-computed for the further heap region is not greater than the relative collection efficiency represented by efficiency metric re-computed for the current heap region, placing an identifier of the further heap region in the priority metric below the current heap region's region identifier; and
    b) if the relative collection efficiency represented by the efficiency metric re-computed for the further heap region is greater than the relative collection efficiency represented by efficiency metric re-computed for the current heap region:
      (1) if no region identifier is left in the priority queue above the position of the current heap region's previous position, placing an identifier of the additional heap region in that position; and
      (2) otherwise, adopting the heap region represented by the region identifier in the position immediately above that position as the current heap region and repeating the efficiency-comparison operation.

7. A computer system as defined in claim 6 wherein the priority queue is a circular queue.

8. A computer system as defined in claim 1 wherein:
A) the garbage collector additionally performs for each general efficiency-metric computation a general sorting operation, in which the garbage collector places the heap regions into an original order in accordance with the efficiency metrics thereby computed; and
B) in each said subset-selection operation, the garbage collector selects heap regions in the original order in which the heap regions were placed in most recent general sorting operation.

9. A computer system as defined in claim 8 wherein:
A) the garbage collector additionally performs for each metric-based collection-set-selection operation a subset-sorting operation, in which the garbage collector places into a priority order in accordance with the re-computation performed for the collection increment for which that metric-based collection-set-selection operation is performed at least the regions whose efficiency metrics thereby computed represent the highest collection efficiencies; and
B) in the metric-based collection-set-selection operations, the heap regions are selected based on the priority orders.

10. A computer system as defined in claim 9 wherein:
A) in each of at least some of the collection increments, the metric-based collection-set-selection operation performed for that collection increment includes selecting more than one of the heap regions from the heap-region subset for inclusion in the collection set; and B) in at least some such collection increments, the subset-selection operation includes adding at least one further heap region to the heap-region subset after the garbage collector has selected one of the heap regions for the collection set and before the garbage collector has selected another of the heap regions therefor.

11. A computer system as defined in claim 10 wherein:
A) to list the priority subset, the garbage collector employs a priority queue that contains region identifiers logically positioned therein in order of recomputed relative collection efficiency from a top end, where a region identifier that identifies the heap region whose re-computed efficiency metric represents the highest of the priority subset's relative collection efficiencies is positioned, and a bottom end, where a region identifier that identifies the heap region whose re-computed efficiency metric represents the lowest of the priority subset's relative efficiencies is positioned; and
B) in at least some circumstances, the garbage collector adds a further heap region to the priority queue by:
  i) adopting the heap region represented by the region identifier at the bottom end of the priority queue as a current heap region, and
  ii) performing an efficiency-comparison operation in which:
    a) if the relative collection efficiency represented by the efficiency metric re-computed for the further heap region is not greater than the relative collection efficiency represented by efficiency metric re-computed for the current heap region, placing an identifier of the further heap region in the priority metric below the current heap region's region identifier; and
    b) if the relative collection efficiency represented by the efficiency metric re-computed for the further heap region is greater than the relative collection efficiency represented by efficiency metric re-computed for the current heap region:
      (1) if no region identifier is left in the priority queue above the position of the current heap region's previous position, placing an identifier of the additional heap region in that position; and
      (2) otherwise, adopting the heap region represented by the region identifier in the position immediately above that position as the current heap region and repeating the efficiency-comparison operation.

12. A computer system as defined in claim 9 wherein:
A) the garbage collector maintains remembered sets that are associated with respective ones of the heap regions and list locations in which references to objects in the heap regions associated therewith have been observed; and
B) the efficiency metric for a given heap region is based at least in part on the size of the remembered set associated therewith.

13. A computer system as defined in claim 9 wherein:
A) the garbage collector additionally performs marking operations by which the garbage collector identifies unreachable memory in the heap regions; and
B) the efficiency metric for a given heap region is based at least in part on the amount of unreachable memory that has thereby been identified in that heap region.

14. A computer system as defined in claim 13 wherein:
A) the garbage collector maintains remembered sets that are associated with respective ones of the heap regions and list locations in which references to objects in the heap regions associated therewith have been observed; and
B) the efficiency metric for a given heap region is based at least in part on the size of the remembered set associated therewith.

15. A method for performing garbage collection in a computer system comprising a mutator and a memory with a heap, comprising:
A) collecting at least a portion of the heap in collection increments, in each of at least some of which there is collected a respective collection set that results from a respective collection-set-selection operation in which at least part of the collection set is selected from among a plurality of heap regions into which at least that portion of the heap is divided;
B) performing general efficiency-metric computations, in each of at least some of which a respective original efficiency metric representing a relative collection efficiency for every heap region in a relatively large plurality of the heap regions is computed;
C) performing, between each of at least some pairs of consecutive ones of the general efficiency-metric computations, a plurality of the collection increments, for each of a plurality of which:
  i) the method includes performing a subset-selection operation, in which there is selected, from among the relatively large plurality of heap regions for which the original efficiency metrics were computed in the most recent of the general efficiency-metric computations, a relatively small heap-region subset in accordance with the original efficiency metrics thereby computed;
  ii) the method includes performing a re-computation of the efficiency metrics for only that heap-region subset; and
  iii) the collection-set-selection operation includes a metric-based collection-set-selection operation, in which a part of the collection set is selected from the heap-region subset in accordance with the efficiency metrics recomputed in that re-computation; and
D) reclaiming the part of the collection set selected from the heap-region subset for reuse by the computer system.

16. A method as defined in claim 15 wherein:
A) the method includes maintaining remembered sets that are associated with respective ones of the heap regions and list locations in which references to objects in the heap regions associated therewith have been observed; and
B) the efficiency metric for a given heap region is based at least in part on the size of the remembered set associated therewith.

17. A method as defined in claim 15 wherein:
A) the method additionally includes performing marking operations by which unreachable memory in the heap regions is identified; and
B) the efficiency metric for a given heap region is based at least in part on the amount of unreachable memory that has thereby been identified in that heap region.

18. A method as defined in claim 17 wherein:
A) the method includes maintaining remembered sets that are associated with respective ones of the heap regions and list locations in which references to objects in the heap regions associated therewith have been observed; and B) the efficiency metric for a given heap region is based at least in part on the size of the remembered set associated therewith.

19. A method as defined in claim 15 wherein:
A) in each of at least some of the collection increments, the metric-based collection-set-selection operation performed for that collection increment includes selecting more than one of the heap regions from the heap-region subset for inclusion in the collection set; and
B) in at least some such collection increments, the subset-selection operation includes adding at least one further heap region to the heap-region subset after one of the heap regions has been selected for the collection set and before another of the heap regions has been selected therefor.

20. A method as defined in claim 19 wherein:
A) the priority subset is listed in a priority queue that contains region identifiers logically positioned therein in order of re-computed relative collection efficiency from a top end, where a region identifier that identifies the heap region whose re-computed efficiency metric represents the highest of the priority subset's relative collection efficiencies is positioned, and a bottom end, where a region identifier that identifies the heap region whose recomputed efficiency metric represents the lowest of the priority subset's relative efficiencies is positioned; and
B) in at least some circumstances, a further heap region is added to the priority queue by:
   i) adopting the heap region represented by the region identifier at the bottom end of the priority queue as a current heap region, and
   ii) performing an efficiency-comparison operation in which:
      a) if the relative collection efficiency represented by the efficiency metric re-computed for the further heap region is not greater than the relative collection efficiency represented by efficiency metric re-computed for the current heap region, placing an identifier of the further heap region in the priority metric below the current heap region's region identifier; and
      b) if the relative collection efficiency represented by the efficiency metric re-computed for the further heap region is greater than the relative collection efficiency represented by efficiency metric re-computed for the current heap region:
         (1) if no region identifier is left in the priority queue above the position of the current heap region's previous position, placing an identifier of the additional heap region in that position; and
         (2) otherwise, adopting the heap region represented by the region identifier in the position immediately above that position as the current heap region and repeating the efficiency-comparison operation.

21. A method as defined in claim 20 wherein the priority queue is a circular queue.

22. A method as defined in claim 15 further comprising:
A) additionally performing for each general efficiency-metric computation a general sorting operation, in which the heap regions are placed into an original order in accordance with the efficiency metrics thereby computed; and
B) in each said subset-selection operation, selecting heap regions in the original order in which the heap regions were placed in most recent general sorting operation.

23. A method as defined in claim 22 wherein:
A) the method includes additionally performing for each metric-based collection-set-selection operation a subset-sorting operation, in which there are placed in priority order, in accordance with the efficiency metrics computed in the re-computation performed for the collection increment for which that metric-based collection-set-selection operation is performed, at least the regions whose thereby-computed efficiency metrics represent the highest collection efficiencies; and
B) in the metric-based collection-set-selection operations, the heap regions are selected in the priority orders in which the subset-sorting operations place them.

24. A method as defined in claim 23 wherein:
A) in each of at least some of the collection increments, the metric-based collection-set-selection operation performed for that collection increment includes selecting more than one of the heap regions from the heap-region subset for inclusion in the collection set; and
B) in at least some such collection increments, the subset-selection operation includes adding at least one further heap region to the heap-region subset after one of the heap regions has been selected for the collection set and before another of the heap regions has been selected therefor.

25. A method as defined in claim 24 wherein:
A) the priority subset is listed in a priority queue that contains region identifiers logically positioned therein in order of re-computed relative collection efficiency from a top end, where a region identifier that identifies the heap region whose re-computed efficiency metric represents the highest of the priority subset's relative collection efficiencies is positioned, and a bottom end, where a region identifier that identifies the heap region whose recomputed efficiency metric represents the lowest of the priority subset's relative efficiencies is positioned; and
B) in at least some circumstances, a further heap region is added to the priority queue by:
   i) adopting the heap region represented by the region identifier at the bottom end of the priority queue as a current heap region, and
   ii) performing an efficiency-comparison operation in which:
      a) if the relative collection efficiency represented by the efficiency metric re-computed for the further heap region is not greater than the relative collection efficiency represented by efficiency metric re-computed for the current heap region, placing an identifier of the further heap region in the priority metric below the current heap region's region identifier; and
      b) if the relative collection efficiency represented by the efficiency metric re-computed for the further heap region is greater than the relative collection efficiency represented by efficiency metric re-computed for the current heap region:
         (1) if no region identifier is left in the priority queue above the position of the current heap region's previous position, placing an identifier of the additional heap region in that position; and
         (2) otherwise, adopting the heap region represented by the region identifier in the position immediately above that position as the current heap region and repeating the efficiency-comparison operation.

26. A method as defined in claim 23 wherein:
A) the method includes maintaining remembered sets that are associated with respective ones of the heap regions and list locations in which references to objects in the heap regions associated therewith have been observed; and
B) the efficiency metric for a given heap region is based at least in part on the size of the remembered set associated therewith.

27. A method as defined in claim 23 wherein:
A) the method additionally includes performing marking operations by which unreachable memory in the heap regions is identified; and
B) the efficiency metric for a given heap region is based at least in part on the amount of unreachable memory that has thereby been identified in that heap region.

28. A method as defined in claim 27 wherein:
A) the method includes maintaining remembered sets that are associated with respective ones of the heap regions and list locations in which references to objects in the heap regions associated therewith have been observed; and
B) the efficiency metric for a given heap region is based at least in part on the size of the remembered set associated therewith.

29. A computer readable storage medium, readable by a computer system comprising a heap and a mutator, containing instructions for configuring a garbage collector associated with the computer system to:
A) collect at least a portion of the heap in collection increments, in each of at least some of which the garbage collector collects a respective collection set that results from a respective collection-set-selection operation in which the garbage collector selects at least part of the collection set from among a plurality of heap regions into which the garbage collector treats at least that portion of the heap as divided;
B) perform general efficiency-metric computations, in each of at least some of which the garbage collector computes a respective original efficiency metric representing a relative collection efficiency for every heap region in a relatively large plurality of the heap regions;
C) perform, between each of at least some pairs of consecutive ones of the general efficiency-metric computations, a plurality of the collection increments, for each of a plurality of which:
  i) the garbage collector performs a subset-selection operation, in which the garbage collector selects, from among the relatively large plurality of heap regions for which the garbage collector computed original efficiency metrics in the most recent of the general efficiency-metric computations, a relatively small heap-region subset in accordance with the original efficiency metrics thereby computed;
  ii) the garbage collector performs a re-computation of the efficiency metrics for only that heap-region subset; and
  iii) the collection-set-selection operation includes a metric-based collection-set-selection operation, in which the garbage collector selects a part of the collection set from the heap-region subset in accordance with the efficiency metrics recomputed in that re-computation; and
D) reclaim the part of the collection set selected from the heap-region subset for reuse by the computer system.

30. A storage medium as defined in claim 29 wherein:
A) the garbage collector maintains remembered sets that are associated with respective ones of the heap regions and list locations in which references to objects in the heap regions associated therewith have been observed; and
B) the efficiency metric for a given heap region is based at least in part on the size of the remembered set associated therewith.

31. A storage medium as defined in claim 29 wherein:
A) the garbage collector additionally performs marking operations by which the garbage collector identifies unreachable memory in the heap regions; and
B) the efficiency metric for a given heap region is based at least in part on the amount of unreachable memory that has thereby been identified in that heap region.

32. A storage medium as defined in claim 31 wherein:
A) the garbage collector maintains remembered sets that are associated with respective ones of the heap regions and list locations in which references to objects in the heap regions associated therewith have been observed; and
B) the efficiency metric for a given heap region is based at least in part on the size of the remembered set associated therewith.

33. A storage medium as defined in claim 29 wherein:
A) in each of at least some of the collection increments, the metric-based collection-set-selection operation performed for that collection increment includes selecting more than one of the heap regions from the heap-region subset for inclusion in the collection set; and
B) in at least some such collection increments, the subset-selection operation includes adding at least one further heap region to the heap-region subset after the garbage collector has selected one of the heap regions for the collection set and before it has selected another of the heap regions therefor.

34. A storage medium as defined in claim 33 wherein:
A) to list the priority subset, the garbage collector employs a priority queue that contains region identifiers logically positioned therein in order of recomputed relative collection efficiency from a top end, where a region identifier that identifies the heap region whose re-computed efficiency metric represents the highest of the priority subset's relative collection efficiencies is positioned, and a bottom end, where a region identifier that identifies the heap region whose re-computed efficiency metric represents the lowest of the priority subset's relative efficiencies is positioned; and
B) in at least some circumstances, the garbage collector adds a further heap region to the priority queue by:
  i) adopting the heap region represented by the region identifier at the bottom end of the priority queue as a current heap region, and
  ii) performing an efficiency-comparison operation in which:
    a) if the relative collection efficiency represented by the efficiency metric re-computed for the further heap region is not greater less the relative collection efficiency represented by efficiency metric re-computed for the current heap region, placing an identifier of the further heap region in the priority metric below the current heap region's region identifier; and b) if the relative collection efficiency represented by the efficiency metric re-computed for the further heap region is greater than the relative collection efficiency represented by efficiency metric re-computed for the current heap region:
(1) if no region identifier is left in the priority queue above the position of the current heap region's previous position, placing an identifier of the additional heap region in that position; and
(2) otherwise, adopting the heap region represented by the region identifier in the position immediately above that position as the current heap region and repeating the efficiency-comparison operation.

35. A storage medium as defined in claim 34 wherein the priority queue is a circular queue.

36. A storage medium as defined in claim 29 wherein:
A) the garbage collector additionally performs for each general efficiency-metric computation a general sorting operation, in which the garbage collector places the heap regions into an original order in accordance with the efficiency metrics thereby computed; and
B) in each said subset-selection operation, the garbage collector selects heap regions in the original order in which the heap regions were placed in most recent general sorting operation.

37. A storage medium as defined in claim 36 wherein:
A) the garbage collector additionally performs for each metric-based collection-set-selection operation a subset-sorting operation, in which the garbage collector places into a priority order in accordance with the re-computation performed for the collection increment for which that metric-based collection-set-selection operation is performed at least the regions whose efficiency metrics thereby computed represent the highest collection efficiencies; and
B) in the metric-based collection-set-selection operations, the heap regions are selected in the priority orders in which the subset-sorting operations place them.

38. A storage medium as defined in claim 37 wherein:
A) in each of at least some of the collection increments, the metric-based collection-set-selection operation performed for that collection increment includes selecting more than one of the heap regions from the heap-region subset for inclusion in the collection set; and
B) in at least some such collection increments, the subset-selection operation includes adding at least one further heap region to the heap-region subset after the garbage collector has selected one of the heap regions for the collection set and before the garbage collector has selected another of the heap regions therefor.

39. A storage medium as defined in claim 38 wherein:
A) to list the priority subset, the garbage collector employs a priority queue that contains region identifiers logically positioned therein in order of recomputed relative collection efficiency from a top end, where a region identifier that identifies the heap region whose re-computed efficiency metric represents the highest of the priority subset's relative collection efficiencies is positioned, and a bottom end, where a region identifier that identifies the heap region whose re-computed efficiency metric represents the lowest of the priority subset's relative efficiencies is positioned; and B) in at least some circumstances, the garbage collector adds a further heap region to the priority queue by:
i) adopting the heap region represented by the region identifier at the bottom end of the priority queue as a current heap region, and
ii) performing an efficiency-comparison operation in which:
a) if the relative collection efficiency represented by the efficiency metric re-computed for the further heap region is not greater than the relative collection efficiency represented by efficiency metric re-computed for the current heap region, placing an identifier of the further heap region in the priority metric below the current heap region's region identifier; and
b) if the relative collection efficiency represented by the efficiency metric re-computed for the further heap region is greater than the relative collection efficiency represented by efficiency metric re-computed for the current heap region:
(1) if no region identifier is left in the priority queue above the position of the current heap region's previous position, placing an identifier of the additional heap region in that position; and
(2) otherwise, adopting the heap region represented by the region identifier in the position immediately above that position as the current heap region and repeating the efficiency-comparison operation.

40. A storage medium as defined in claim 37 wherein:
A) the garbage collector maintains remembered sets that are associated with respective ones of the heap regions and list locations in which references to objects in the heap regions associated therewith have been observed; and
B) the efficiency metric for a given heap region is based at least in part on the size of the remembered set associated therewith.

41. A storage medium as defined in claim 37 wherein:
A) the garbage collector additionally performs marking operations by which the garbage collector identifies unreachable memory in the heap regions; and
B) the efficiency metric for a given heap region is based at least in part on the amount of unreachable memory that has thereby been identified in that heap region.

42. A storage medium as defined in claim 41 wherein:
A) the garbage collector maintains remembered sets that are associated with respective ones of the heap regions and list locations in which references to objects in the heap regions associated therewith have been observed; and
B) the efficiency-metric for a given heap region is based at least in part on the size of the remembered set associated therewith.

43. A garbage collector comprising:
A) means for collecting in collection increments at least a portion of a heap in a memory of a computer system that, in each of at least some of the collection increments there is collected a respective collection set that results from a respective collection-set-selection operation in which at least part of the collection set is selected from among a plurality of heap regions into which at least that portion of the heap is divided;

B) means for performing general efficiency-metric computations, in each of at least some of which a respective original efficiency metric representing a relative collection efficiency for every heap region in a relatively large plurality of the heap regions is computed; and C) means for performing, between each of at least some pairs of consecutive ones of the general efficiency-metric computations, a plurality of the collection increments, for each of a plurality of which:

i) the garbage collector performs a subset-selection operation, in which the garbage collector selects, from among the relatively large plurality of heap regions for which the garbage collector computed original efficiency metrics in the most recent of the general efficiency-metric computations, a relatively small heap-region subset in accordance with the original efficiency metrics thereby computed;

ii) the garbage collector performs a re-computation of the efficiency metrics for only that heap-region subset; and iii) the collection-set-selection operation includes a metric-based collection-set-selection operation, in which the garbage collector selects at least part of the collection set from the heap-region subset in accordance with the efficiency metrics recomputed in that re-computation.

\* \* \* \* \*